(12) United States Patent
Fox et al.

(10) Patent No.: US 7,599,902 B2
(45) Date of Patent: Oct. 6, 2009

(54) ANALOGICAL REASONING SYSTEM

(75) Inventors: Jason Fox, Thousand Oaks, CA (US);
Chris Furmanski, Piedmont, CA (US);
Collin Green, Mountain View, CA (US)

(73) Assignee: HRL Laboratories, LLC, Malibu, CA (US)

( * ) Notice: Subject to any disclaimer, the term of this patent is extended or adjusted under 35 U.S.C. 154(b) by 248 days.

(21) Appl. No.: 11/413,904

(22) Filed: Apr. 27, 2006

(65) Prior Publication Data
US 2007/0255671 A1 Nov. 1, 2007

(51) Int. Cl.
*G06N 7/04* (2006.01)
(52) U.S. Cl. .............................. 706/54; 700/44; 700/79
(58) Field of Classification Search .................. 706/54, 706/12; 702/189; 705/80
See application file for complete search history.

(56) References Cited

U.S. PATENT DOCUMENTS

| | | | |
|---|---|---|---|
| 4,777,585 A | 10/1988 | Kokawa et al. | |
| 4,899,290 A | 2/1990 | Hartzband | |
| 4,905,162 A | 2/1990 | Hartzband et al. | |
| 5,276,774 A * | 1/1994 | Orihara et al. | 706/54 |
| 5,473,732 A | 12/1995 | Chang | |
| 5,696,693 A | 12/1997 | Aubel et al. | |
| 5,784,540 A | 7/1998 | Faltings | |
| 5,852,814 A | 12/1998 | Allen | |
| 2004/0133526 A1 * | 7/2004 | Shmueli et al. | 705/80 |

OTHER PUBLICATIONS

Analogical Reasoning Techniques in Intelligent Counterterrorism System, A. Markman, D. Rachkovskij, I. Misuno, E. Revunova.*

* cited by examiner

*Primary Examiner*—David R Vincent
*Assistant Examiner*—Kalpana Bharadwaj
(74) *Attorney, Agent, or Firm*—Tope-McKay & Assoc.

(57) ABSTRACT

The present invention relates to a general-purpose analogical reasoning system. More specifically, the present invention relates to a high-performance, semantic-based hybrid architecture for analogical reasoning, capable of finding correspondences between a novel situation and a known situation using relational symmetries, object similarities, or a combination of the two. The system is a high-performance symbolic connectionist model which multiplexes activation across a non-temporal dimension and uses controlled activation flow based on an analogical network structure. The system uses incremental inference to stop inference early for object correspondence, uses initial mappings to constrain future mappings, uses inferred mappings to synchronize activation, and independent mapping based on roles, superficial similarity, or composites.

33 Claims, 16 Drawing Sheets

| Symbol | Entity | Purpose | Examples |
|---|---|---|---|
| ⬜ (dashed) | Analog | A collection of propositions | •individual makes bomb<br>bomb destroys target<br>•individual makes bomb |
| ⬭ 306 | Proposition | A relational structure, including a predicate and potentially many roles and role fillers | •individual as maker<br>•bomb as made |
| ☐ 308 | Sub Proposition | Binds predicates (roles) to arguments (role fillers) | •maker<br>•made |
| △ 302 | Predicate | The roles of a relation | •individual<br>•bomb |
| ◯ 310 | Object | A role filler | •explosive |
| ☐ Object ⬡ Predicate Semantics  304 / 310 / 312 / 314 | Simple Semantics | A token based semantic unit | |

FIG. 3

Correlations between pairs of nodes $$correlation = \sum source_i \cdot target_i$$

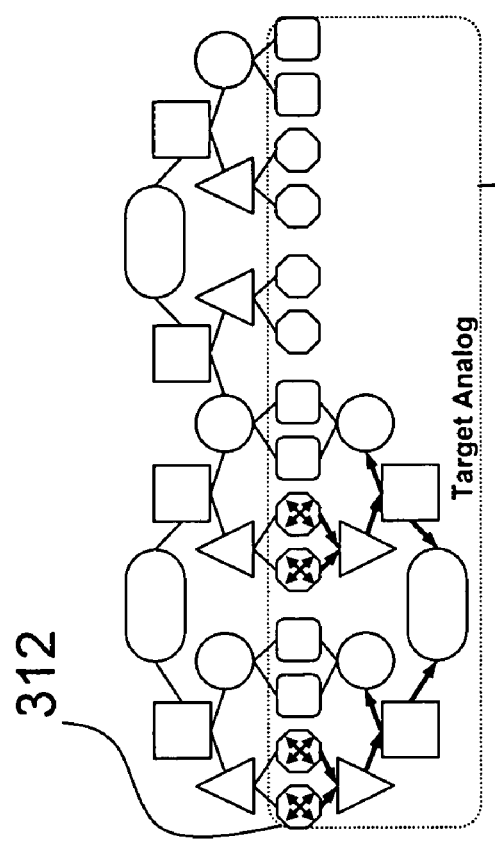
FIG. 8
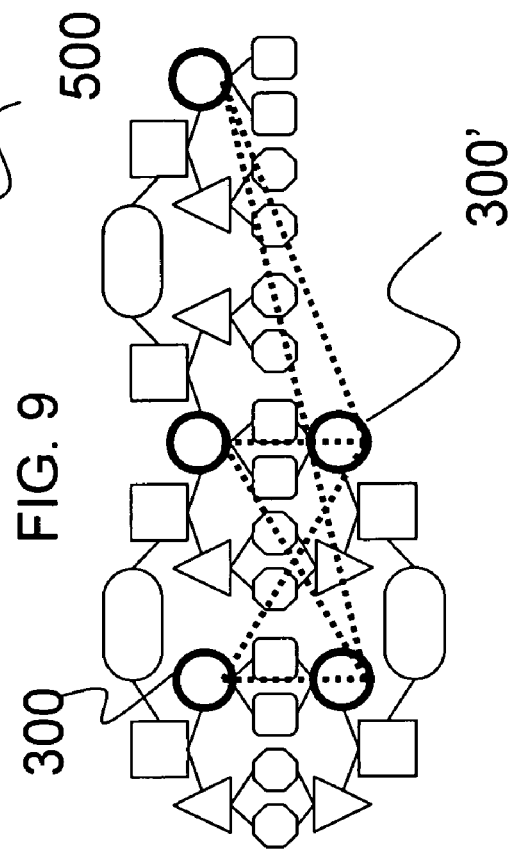
FIG. 9
FIG. 10
FIG. 11

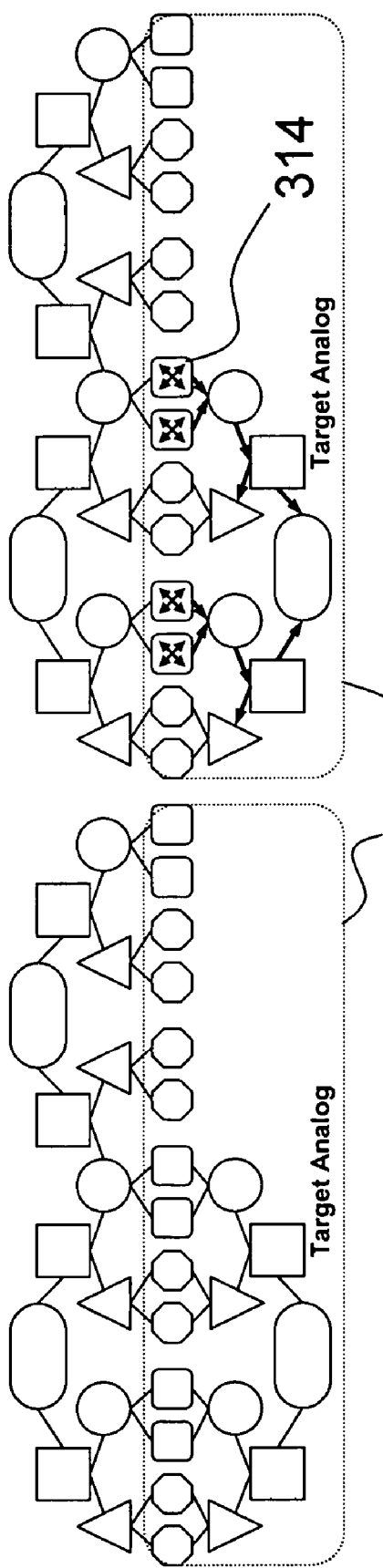
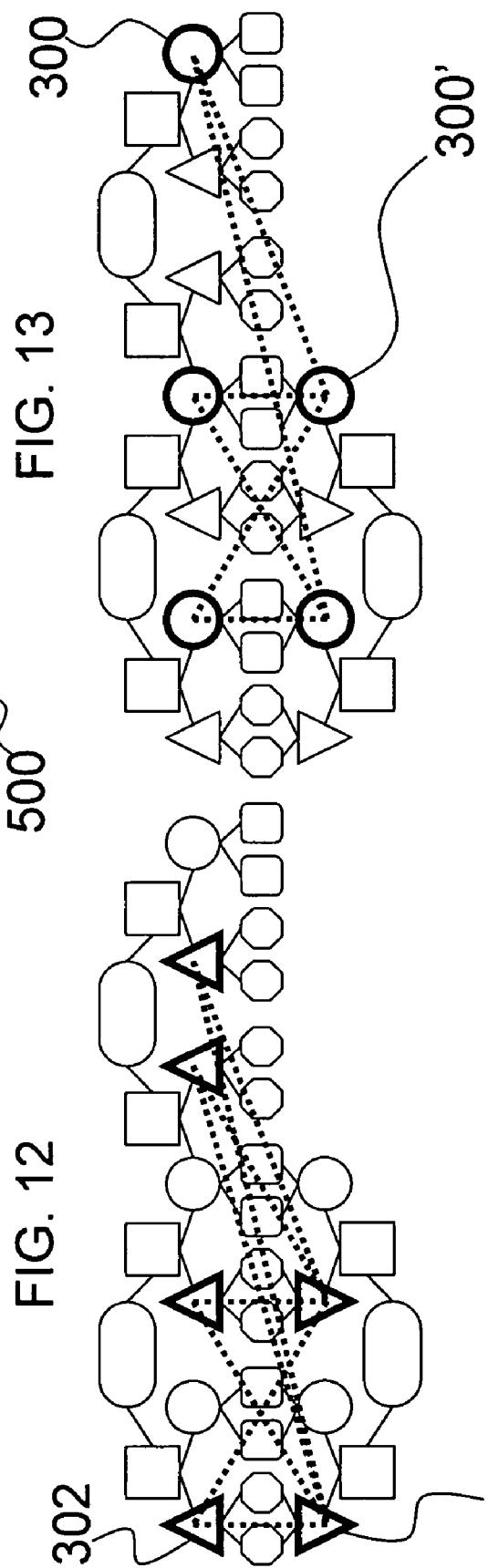
FIG. 12
FIG. 13
FIG. 14
FIG. 15

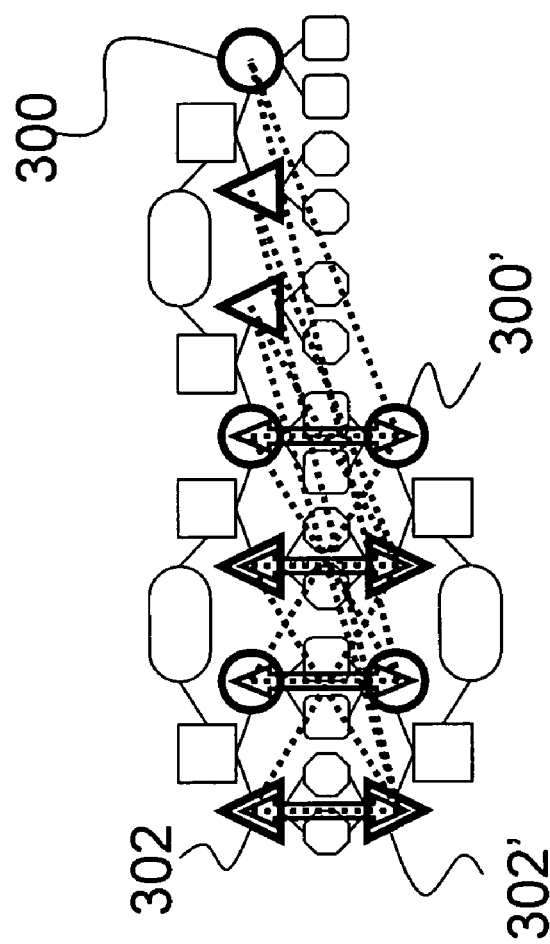
FIG. 16
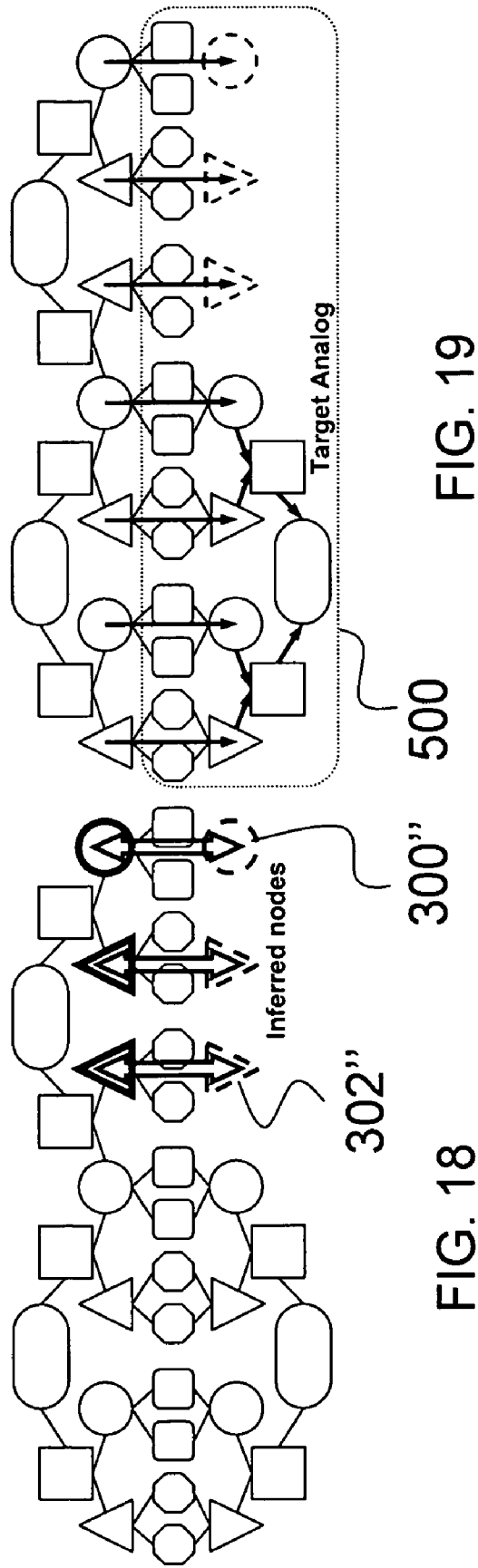
FIG. 17
FIG. 18
FIG. 19

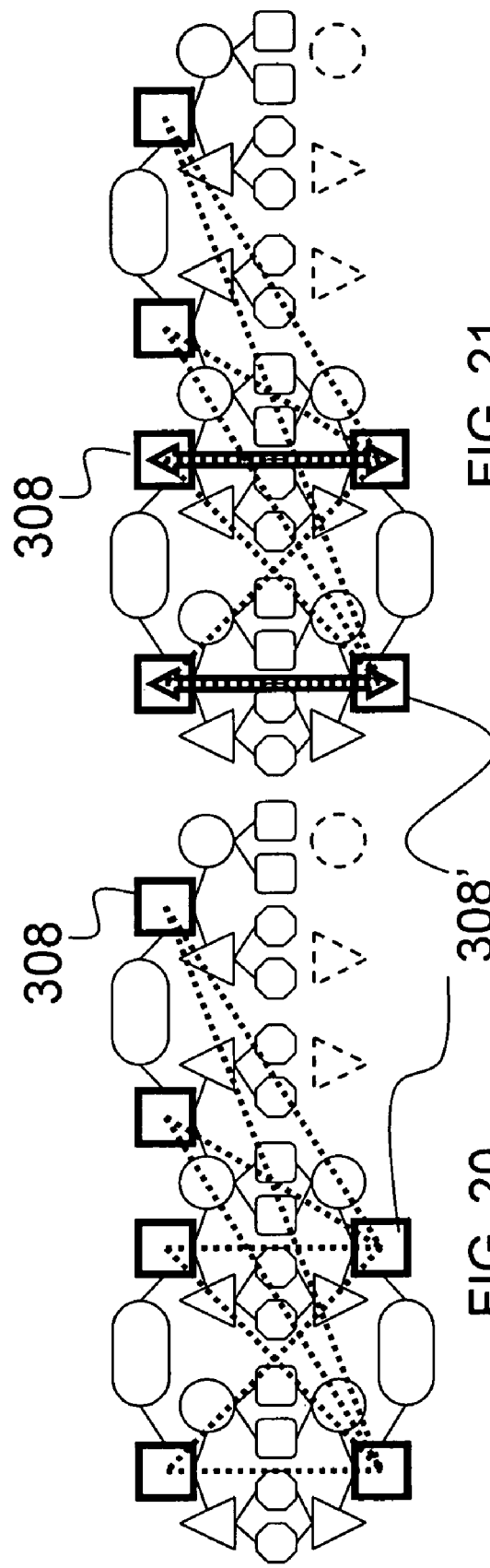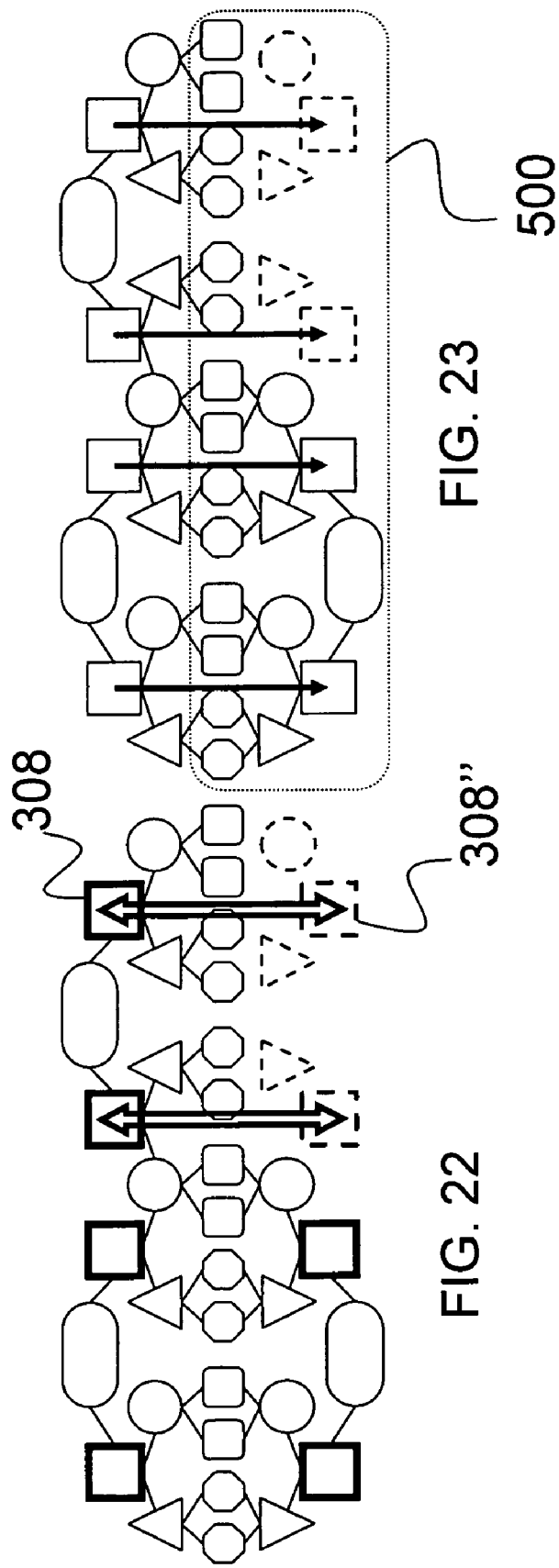

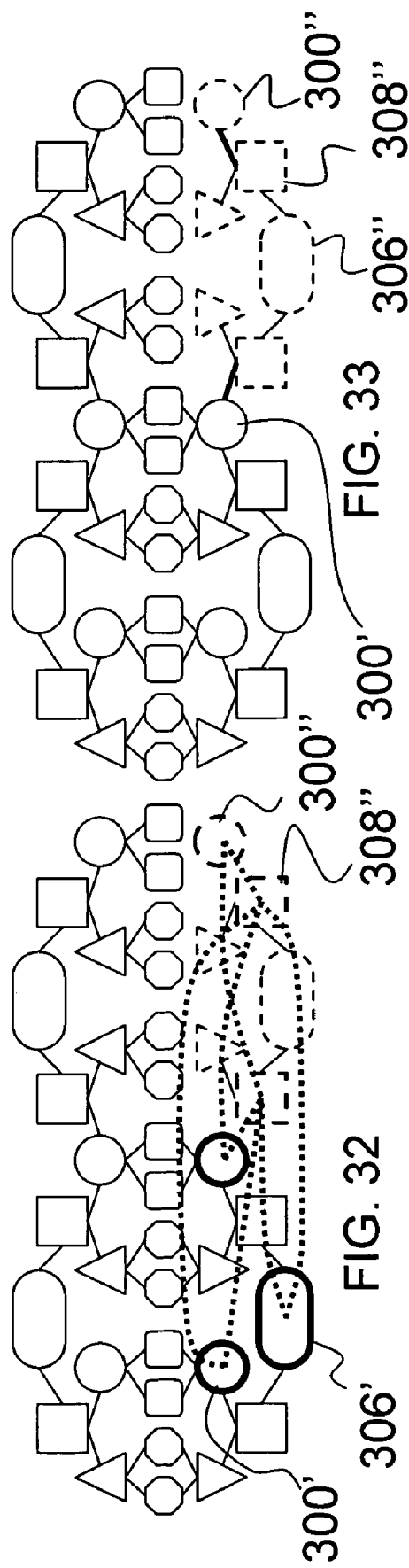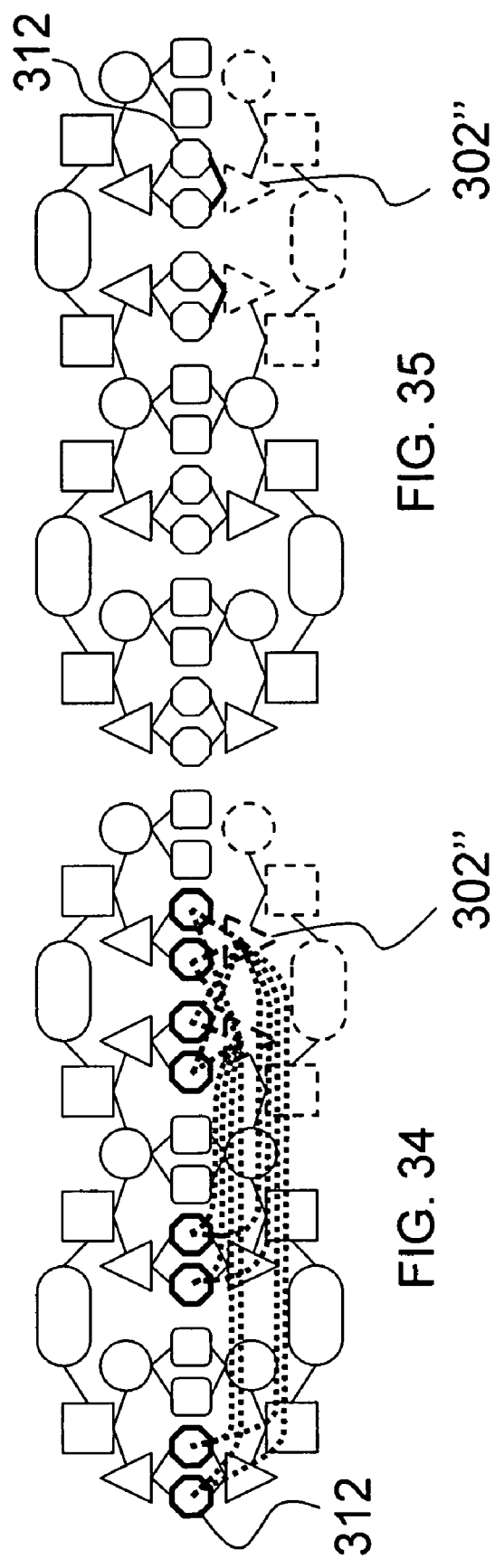

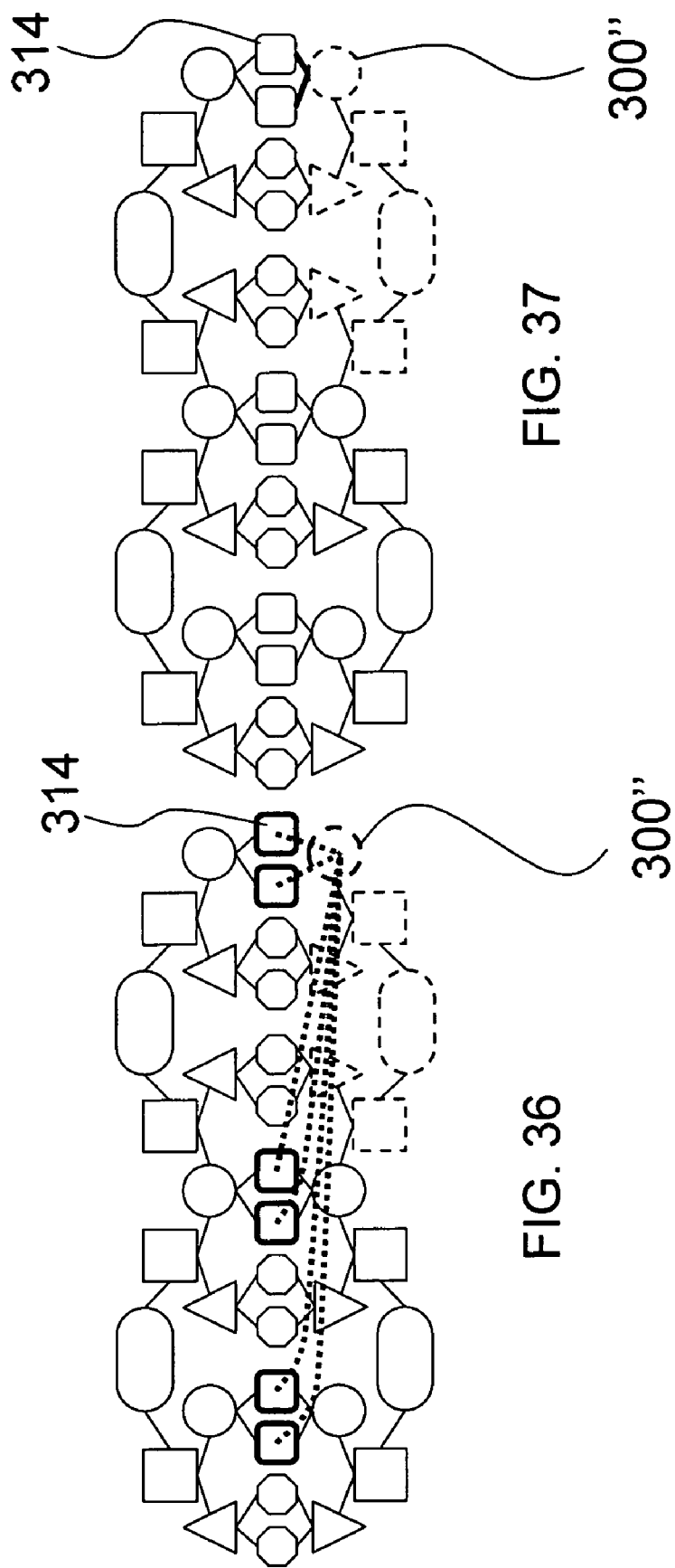

ANALOGICAL REASONING SYSTEM

BACKGROUND OF THE INVENTION (1) Technical Field

The present invention relates to a high-performance general-purpose analogical reasoning system. More specifically, the present invention relates semantic-based hybrid architecture for analogical reasoning using non-temporal activation multiplexing capable of finding correspondences between a novel situation and a known situation using relational symmetries, object similarities, or a combination of the two.

(2) Description of Related Art

Analogical reasoning is a process by which a solution can be inferred based on existing knowledge. Some prior art exists for generic implementations of analogical reasoning methods and devices (U.S. Pat. No. 5,276,774), autonomous case-based reasoning agents (U.S. Pat. No. 5,852,814), relational artificial intelligence (AI) system (U.S. Pat. No. 5,473,732), analogical evaluation and control systems (U.S. Pat. No. 4,905,162, U.S. Pat. No. 4,777,585), as well as specific implementations for protocol execution and specification (U.S. Pat. No. 4,899,290), positional planning (U.S. Pat. No. 5,696,693), and topographical inference (U.S. Pat. No. 5,784,540). For the most part, these patents employ different reasoning strategies (e.g., case-based reasoning) or are applied in specific domains (i.e., planning or topographical inference).

Although there are reasoning models in the literature that mention analogical strategies, each has several shortcomings.

A Structure Mapping Engine (SME) is a program for studying analogical reasoning and generally includes a model for constructing matching algorithms consistent with structure-mapping theory. SME is described in "*The Structure-Mapping Engine: Algorithm and Examples*," 1989, *Artificial Intelligence*, 41, 1-63, by Falkenhainer, B., Forbus, K. D., and Gentner, D. The SME model does not contain semantic information explicitly. Instead, SME employs attributes (which are explicitly predicated facts about an entity, e.g., HEAVY John). SME uses attributes (or function-constant pairings) to perform some mappings, and employs the identicality constraint to perform others. However, the simplifying assumptions that SME makes about semantics may lead to difficulty in certain situations.

Another example is ACT-R. ACT-R is a cognitive architecture containing a theory about human cognition. ACT-R was developed by the ACT-R Research Group at Carnegie Mellon University. Carnegie Mellon University is located at 5000 Forbes Avenue, Pittsburgh, Pa. 15213, U.S.A. One major problem with the path-mapping algorithm of ACT-R is its consideration of only one "path" at a time. That is, a single non-branching sub-graph connecting an entity or relation to a root relation is specified during mapping. This fact may introduce errors that seem unlikely to be committed by humans and are not beneficial to solving difficult problems. In short, when an object or relation serves as the argument to two or more other relations, path-mapping will not consider the joint role of that object or relation, but only a single randomly selected role.

Another example of a cognitive architecture is Prodigy-Analogy. Prodigy-Analogy is a combined case-based and generative planner developed by researchers at Carnegie Mellon University. In the context of more general problem-solving, Prodigy-Analogy may be limited by the need for user preconditions that specify the desired end-state of the problem space in significant detail. This may be a liability when the solution is not well defined. While the specification of the goal state in some domains is trivial (e.g., a route-planning problem cannot be defined without a specific destination), it may prove less obvious in other domains (e.g., the goal "defend town X" is not heavily constrained). In some sense, the derivational analogy process is excellent for planning given a well-defined goal state, but that some other procedure may be necessary for forming that well-defined goal state.

Like SME, the VivoMind Analogy Engine (VAE) relies heavily on syntax and structure, paying little attention to semantics except in terms of labels on graph nodes. The VAE is an analogy finder that uses graphs for its knowledge representation. The VAE was described in an article by John Sowa and Arun Majumdar, entitled, "Analogical reasoning," co-authored with Arun K. Majumdar, in de Moor, Lex, Ganter, eds., *Conceptual Structures for Knowledge Creation and Communication*, Proceedings of ICCS 2003, LNAI 2746, Springer-Verlag, Berlin, 2003, pp. 16-36.

Another reasoning system is the Learning and Inference with Schemas and Analogies (LISA) system designed by John Hummel and Keith Holyoak. John Hummel is a professor at the University of Illinois at Urbana-Champaign, located at 603 East Daniel St., Champaign, Ill. 61820. Keith Holyoak is a professor at the University of California, Los Angeles, located at the Neuroscience and Genetics Research Center, 695 Charles Young Drive, Los Angeles, Calif. 90095-1761.

Although functional for simple inferences, LISA is ill-suited as an extensible, performance-focused reasoner for real-world applications. LISA's implementation of temporal binding necessitates dozens of passes though the network to successfully segregate disparate roles and fillers. LISA requires its reasoning algorithm to traverse its neural network hundreds of times. Each successive pass through the network increases the computation time, decreasing its performance and desirability in real-world applications.

Thus, a continuing need exists for a versatile and efficient analogical reasoning system.

SUMMARY OF THE INVENTION

The present invention relates to a high-performance general-purpose analogical reasoning system. The system comprises a data processor having a neural network that is configured to perform symbolic substitution by finding a correspondence between a target analog and a source analog to infer a solution to the target analog based on the source analog.

To enable symbolic substitution, each of the source analog and the target analog includes a plurality of nodes in the form of object/predicate units (OP units), proposition units (Prop units), sub-proposition units (SP units), and semantic units. The OP units are nodes that represent object nodes and predicate nodes independently of how they are bound together. The Prop units are nodes that correspond to complete propositional statements to form a relational structure. The SP units are nodes that represent sub-proposition units that are conjunctive representations of role-filler bindings, binding predicate nodes to object nodes. The semantic units are nodes in a semantic domain that relate to a corresponding predicate node and object node, forming predicate semantic nodes and object semantic nodes respectively. The semantic units represent the meaningfulness of predicate and object nodes and the degree of similarity between multiple predicate nodes or multiple object nodes. Additionally, the source analog and the target analog share the same semantic domain with at least some shared semantic units.

The neural network is configured to perform the following operations:
  activate the SP units in the source analog and propagate activity to the Prop units and the semantic units in the source analog;
  propagate activity received from the SP units of the source analog from the semantic units in the target analog to at least one of the SP units, OP units, and Prop units in the target analog;
  compute correlations for the OP units between the source analog and the target analog due to the semantic units;
  combine correlations due to the semantic units;
  competitively select single mappings between the source analog and the target analog of like kind OP unit nodes;
  inferedly generate new inferred predicate nodes and inferred object nodes in the target analog for any that are unmapped in the source analog;
  activate the target analog through the single mappings;
  compute correlations for the SP units between the source analog and the target analog;
  competitively select single mappings between the source analog and the target analog for the SP unit nodes;
  inferedly generate new inferred SP unit nodes in the target analog for any that are unmapped in the source analog;
  activate the target analog through all new single mappings;
  compute correlations for the Prop units between the source analog and the target analog;
  competitively select single mappings between the source analog and the target analog for the Prop units;
  inferedly generate new inferred Prop unit nodes in the target analog for any that are unmapped in the source analog;
  activate the target analog through all new single mappings;
  compute correlations between inferred Prop units and inferred SP units in the target analog to find parents for the inferred SP units;
  competitively connect the inferred Prop units to the inferred SP units when correlation strengths are greater than or equal to a predetermined threshold;
  compute correlations between the inferred SP units and the inferred predicate nodes in the target analog to find children of the inferred SP units;
  competitively connect the inferred SP units to predicate nodes when correlation strengths are greater than or equal to a predetermined threshold;
  compute correlations between the inferred SP units and all the Prop units and object nodes in the target analog to find children of the SP units;
  competitively connect the inferred SP units to Prop units or object nodes when correlation strengths are greater than or equal to a predetermined threshold;
  compute correlations between inferred predicate nodes and all predicate semantic units in the target analog;
  competitively connect inferred predicate nodes to predicate semantics when correlation strengths are greater than or equal to a predetermined threshold;
  compute correlations between the inferred object nodes and all object semantic units in the target analog; and
  competitively connect inferred object nodes to object semantic units when correlation strengths are greater than or equal to a predetermined threshold, whereby a collection of the inferred object nodes, inferred predicate nodes, inferred SP units and inferred Prop units provides a user with a solution to the target analog.

In another aspect, when activating the SP units in the source analog and propagating activity out to the Prop units and the semantic units, the neural network is further configured to perform the following operations:
  initialize each SP unit with activation on a unique frequency, where activations are only passed to adjacent connected nodes, such that activations are passed in the source analog from SP units to Prop units, SP units to OP units, and OP units to semantic units, and where the activations are passed in the target analog from semantic units to OP units, OP units to SP units, and SP units to Prop units; and
  propagate activation out from the SP units to the semantic units in the source analog, where each frequency is propagated independently such that semantic unit nodes receive activation on multiple frequencies.

In yet another aspect, when computing correlations for the OP units between the source analog and the target analog due to the semantic units, and when combining the results of correlating due to the semantic units, the neural network is further configured to perform the following operations:
  propagate activity received from SP units of the source analog from the predicate semantic nodes in the target analog;
  compute correlations for the predicate nodes between the source analog and target analog due to the predicate semantic nodes alone;
  compute correlations for the object nodes between the source analog and the target analog due to predicate semantic nodes alone;
  clear activity in the target analog;
  propagate activity received from the SP units of the source analog from the object semantic nodes in the target analog;
  compute correlations for the predicate nodes between the source analog and the target analog due to the object semantic nodes alone;
  compute correlations for the object nodes between the source analog and the target analog due to the object semantic nodes alone; and
  combine results from correlating due to object semantics and predicate semantics.

Furthermore, when computing correlations, the neural network is configured to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units that are being correlated, according to the following:

$$C_R(i,j) = \Sigma A_i(n) A_j(n),$$

where $A_i(n)$ and $A_j(n)$ are activation values of units i and j, respectively, on entry n;
and where matrix $C_N$ is calculated by dividing each entry in $C_R$ by the maximum entry in its row or column, according to the following:

$$C_N(i,j) = C_R(i,j)/[\max(C_R(\bullet,j), C_R(i,\bullet))],$$

wherein for at least one of the semantic units, SP units, Prop units, and OP units, a matrix $C_N$ is calculated for each of two passes through the neural network, wherein in one pass, activation flows from the source analog to the target analog through object semantic units, resulting in matrix $OC_N$, and wherein in another pass, activation flows through predicate semantic units, resulting in matrix $PC_N$.

In yet another aspect, when combining the results from correlating due to object semantics and predicate semantics, the neural network is further configured to determine which correspondences between the source analog and the target analog are the best by forming a composite matrix ($AllC_R$), the matrix $AllC_R$ being formed by calculating a weighted average of $OC_N$ and $PC_N$ according to the following:

$$AllC_R = \alpha OC_N + \beta PC_N,$$

where $\alpha$ and $\beta$ are weight parameters between the range [0,1], and where once calculated, the composite matrix is normalized to create a resulting matrix ($AllC_N$) that determines the correspondences that are chosen, where the matrix $AllC_N$ is calculated according to the following:

$$AllC_N(i,j) = AllC_R(i,j)/[\max(AllC_R(\bullet,j), AllC_R(i,\bullet))].$$

In another aspect, when computing correlations for the OP units between the source analog and the target analog due to the semantic units, and when combining the results of correlating due to the semantic units, the neural network is further configured to perform the following operations:
  propagate activity received from the SP units in the source analog from the predicate semantic nodes in the target analog;
  compute correlations for the predicate nodes between the source analog and target analog due to the predicate semantic nodes alone;
  compute correlations for the object nodes between the source analog and the target analog due to predicate semantic nodes alone;
  combine results from the correlations.

In another aspect, when computing correlations, the neural network is configured to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units (i.e., nodes) that are being correlated, according to the following:

$$C_R(i,j) = \Sigma A_i(n) A_j(n),$$

where $A_i(n)$ and $A_j(n)$ are activation values of units i and j, respectively, on entry n;
and where matrix $C_N$ is calculated by dividing each entry in $C_R$ by the maximum entry in its row or column, according to the following:

$$C_N(i,j) = C_R(i,j)/[\max(C_R(\bullet,j), C_R(i,\bullet))],$$

wherein for at least one of the semantic units, SP units, Prop units, and OP units, a matrix $C_N$ is calculated where activation flows through predicate semantic nodes, resulting in matrix $PC_N$.

Additionally, when combining the results from correlating, the neural network is further configured to determine which correspondences between the source analog and the target analog are the best by creating a matrix ($AllC_N$) that determines the correspondences that are chosen, where the matrix $AllC_N$ is calculated according to the following:

$$AllC_N(i,j) = PC_N(i,j)/[\max(PC_N(\bullet,j), PC_N(i,\bullet))].$$

In yet another aspect, when computing correlations for the OP units between the source analog and the target analog due to the semantic units, and when combining the results of correlating due to the semantic units, the neural network is further configured to perform the following operations:
  propagate activity received from the source analog out from the object semantic nodes in the target analog;
  compute correlations for the predicate nodes between the source analog and the target analog due to the object semantic nodes alone;
  compute correlations for the object nodes between the source analog and the target analog due to the object semantic nodes alone; and
  combine results from the correlations.

Furthermore, when computing correlations, the neural network is configured to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units (nodes) that are being correlated, according to the following:

$$C_R(i,j) = \Sigma A_i(n) A_j(n),$$

where $A_i(n)$ and $A_j(n)$ are activation values of units i and j, respectively, on entry n;
and where matrix $C_N$ is calculated by dividing each entry in $C_R$ by the maximum entry in its row or column, according to the following:

$$C_N(i,j) = C_R(i,j)/[\max(C_R(\bullet,j), C_R(i,\bullet))],$$

wherein for at least one of the semantic units, SP units, Prop units, and OP units, a matrix $C_N$ is calculated where activation flows through object semantic nodes, resulting in matrix $OC_N$.

In another aspect, when combining the results from correlating, the neural network is further configured to determine which correspondences between the source analog and the target analog are the best by creating a matrix ($AllC_N$) that determines the correspondences that are chosen, where the matrix $AllC_N$ is calculated according to the following:

$$AllC_N(i,j) = OC_N(i,j)/[\max(OC_N(\bullet,j), OC_N(i,\bullet))].$$

Finally, as can be appreciated by one skilled in the art, the present invention also comprises a method and computer program product for performing the operations of the system described herein.

BRIEF DESCRIPTION OF THE DRAWINGS

The objects, features and advantages of the present invention will be apparent from the following detailed descriptions of the disclosed aspects of the invention in conjunction with reference to the following drawings, where:

FIG. 3 is a table depicting naming conventions assigned to various nodes according to the present invention;

FIG. 8 is an illustration of an act in the SHAAR algorithm, illustrating the activation of SP units in the source analog with activity being propagated out to Prop units and semantic units in the source analog;

FIG. 9 is an illustration of an act in the SHAAR algorithm, illustrating the propagation of activity received from the source analog out from the predicate semantics in the target analog;

FIG. 10 is an illustration of an act in the SHAAR algorithm, illustrating how the SHAAR algorithm computes correlations for predicates in the source analog and predicates in the target analog based upon the predicate semantics alone;

FIG. 11 is an illustration of an act in the SHAAR algorithm, illustrating how the SHAAR algorithm computes correlations for objects between the source and target analogs due to predicate semantics alone;

FIG. 12 is an illustration of an act in the SHAAR algorithm, illustrating the activity in the target analog being cleared;

FIG. 13 is an illustration of an act in the SHAAR algorithm, illustrating how the SHAAR algorithm propagates the activity received from the source analog out from the object semantic units in the target analog;

FIG. 14 is an illustration of an act in the SHAAR algorithm, illustrating how the SHAAR algorithm computes correlations for predicates between the source and target analogs due to object semantics alone;

FIG. 15 is an illustration of an act in the SHAAR algorithm, illustrating the correlation for objects between the source and target analogs due to object semantics alone;

FIG. 16 is an illustration of an act in the SHAAR algorithm, illustrating the combined results of correlating due to object and predicate semantics;

FIG. 17 is an illustration of an act in the SHAAR algorithm, illustrating how SHAAR competitively selects single mappings between the source analog and the target analog, mapping predicates to predicates and objects to objects;

FIG. 18 is an illustration of an act in the SHAAR algorithm, illustrating how SHAAR infers new predicates and objects in the target analog for any unmapped in the source analog;

FIG. 19 is an illustration of an act in the SHAAR algorithm, illustrating the activation of the target analog through all of the new mappings;

FIG. 20 is an illustration of an act in the SHAAR algorithm, illustrating how the SHAAR algorithm computes the correlations for SP units between the source and target analogs;

FIG. 21 is an illustration of an act in the SHAAR algorithm, illustrating how SHAAR competitively selects single mappings between the source analog and the target analog, with SP units mapped to SP units;

FIG. 22 is an illustration of an act in the SHAAR algorithm, illustrating the inference of new SP units in the target analog for any unmapped SP units in the source analog;

FIG. 23 is an illustration of an act in the SHAAR algorithm, illustrating the activation of the target analog through all of the new mappings;

FIG. 32 is an illustration of an act in the SHAAR algorithm, illustrating how the SHAAR algorithm computes the correlations between inferred SP units and all Prop units and objects in the target analog;

FIG. 33 is an illustration of an act in the SHAAR algorithm, illustrating how SHAAR competitively connects SP units to the Prop units or objects when correlation strengths are greater than or equal to a predetermined threshold;

FIG. 34 is an illustration of an act in the SHAAR algorithm, illustrating how the SHAAR algorithm computes the correlations between inferred predicates and all predicate semantic units in the target analog;

FIG. 35 is an illustration of an act in the SHAAR algorithm, illustrating how SHAAR connects predicates to predicate semantic units when correlation strengths are greater than or equal to a predetermined threshold;

FIG. 36 is an illustration of an act in the SHAAR algorithm, illustrating how the SHAAR algorithm computes the correlations between inferred objects and all object semantic units in the target analog; and FIG. 37 is an illustration of an act in the SHAAR algorithm, illustrating how SHAAR connects objects to object semantic units when correlation strengths are greater than or equal to a predetermined threshold.

DETAILED DESCRIPTION

Figure 1:
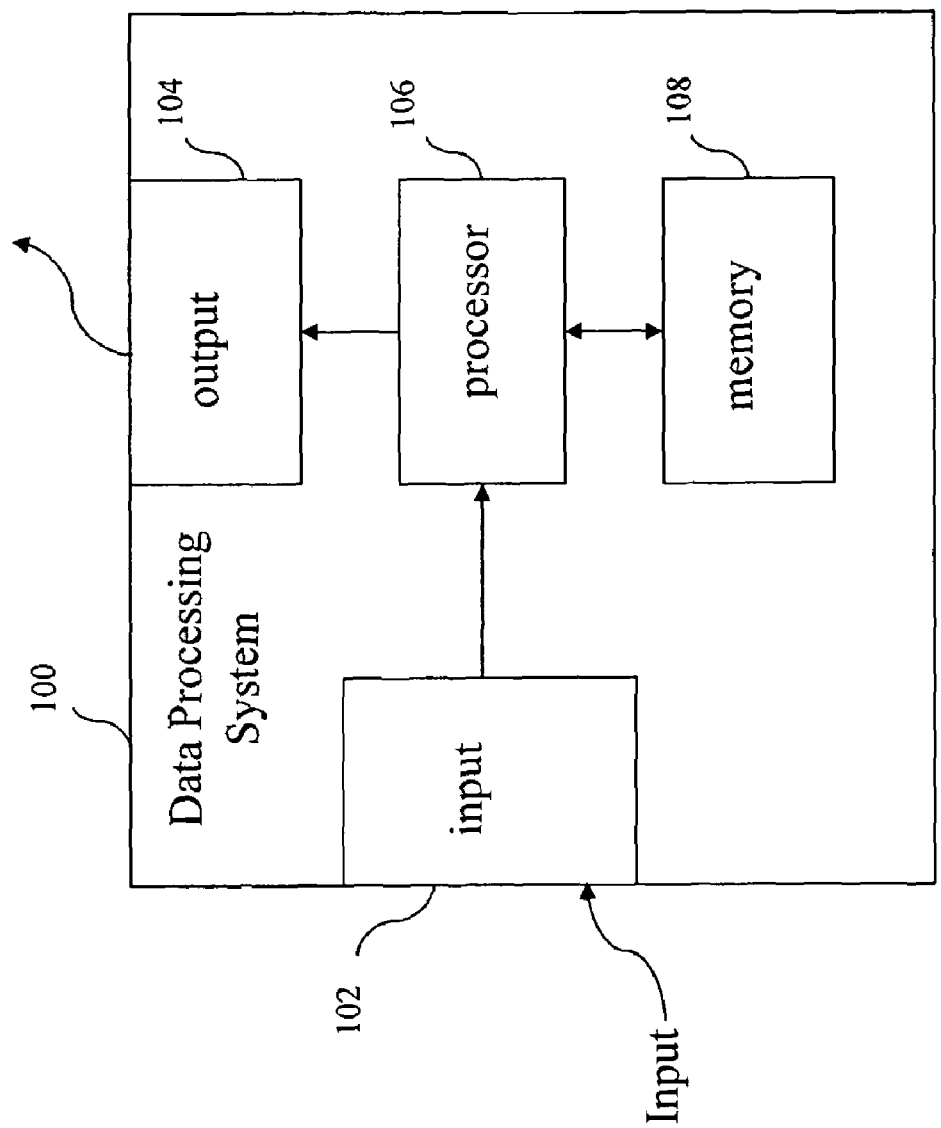
FIG. 1 is a block diagram depicting the components of an analogical reasoning system of the present invention.

The present invention relates to a general purpose analogical reasoning system which uses a symbolic-connectionist model of structure mapping that employs a distributed representation of objects and predicates. The Semantic-based Hybrid Architecture for Analogical Reasoning (SHAAR) also uses non-temporal activation multiplexing, controlled activation flow, incremental inference, inferred mappings and independent mappings based on roles, superficial similarities, or composites. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is given as a central resource for the reader. Next, a description of various principal aspects of the present invention is provided. Third, an introduction is provided to provide the reader with a general understanding of the present invention. Finally, a description of various aspects of the present invention is provided to give an understanding of the specific details.

(1) Glossary

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

Object/Predicate Units (OP units)—The term "OP units" refers to nodes that represent object nodes (role filler) and predicate nodes (roles of a relation) independently of how they are bound together.

Proposition Units (Prop units)—The term "Prop units" refers to nodes that correspond to complete propositional statements to form a relational structure.

Sub-Proposition Units (SP units)—The term SP units refers to nodes that represent sub-proposition units that are conjunctive representations of role-filler bindings, binding predicate nodes to object nodes.

Semantic Units—The term "semantic units" refers to nodes in a semantic domain that relate to a corresponding predicate node and object node, forming predicate semantic nodes and object semantic nodes respectively, where semantic units represent the meaningfulness of predicate and object nodes and the degree of similarity between multiple predicate nodes or multiple object nodes.

Source Analog—The term "source analog" refers to a collection of knowledge, comprising Prop units, SP units, OP units, and semantic units used to contextualize or enrich the representation of a particular target analog. A source analog is a knowledge base or background forming the frame of reference for target analogs.

Target Analog—The term "target analog" refers to a collection of knowledge, comprising Prop units, SP units, OP units, and semantic units that is contextualized or enriched by semantic comparison with one or more source analogs through analogical reasoning. A target analog is a problem that the analogical reasoning system attempts to solve, usually representing a current situation compared to the background information represented as source analogs.

(2) Principal Aspects

The present invention has three "principal" aspects. The first is an analogical reasoning system. The analogical reasoning system is typically in the form of data processor having a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of an analogical reasoning system of the present invention is provided in FIG. 1. The analogical reasoning system 100 comprises an input 102 for receiving information for use in the analogical reasoning. Note that the input 102 may include multiple "ports." Typically, input is received from at user or by sensing various objects in a scene. An output 104 is connected with the processor for providing a target solution using known information. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
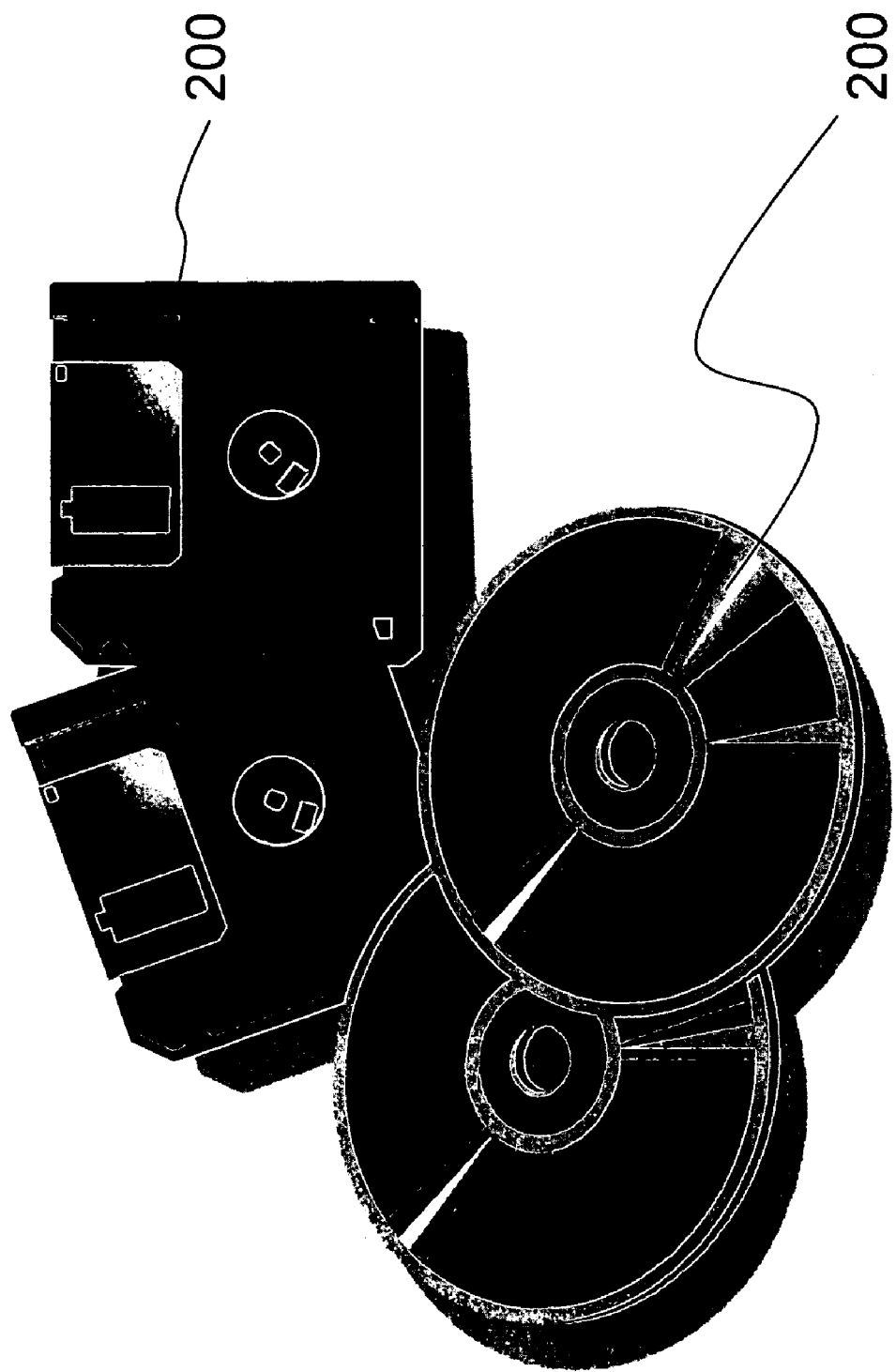
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

Semantic-based Hybrid Architecture for Analogical Reasoning (SHAAR) is a general purpose analogical reasoning system. SHAAR uses a symbolic-connectionist model of structure mapping that employs a distributed representation of objects and predicates for use in a wide range of domains. SHAAR allows a user to solve problems of much greater size than other existing devices.

Potential applications for SHAAR include adaptive and autonomous control for robot/unmanned vehicles, strategic intelligence for agents and entities in simulation and virtual training environments, and decision support or agent development for intelligence applications.

SHAAR's partial propagation in its neural network, controlled activation flow, and non-temporal activation multiplexing give it tremendous performance advantages. Additionally, SHAAR uses a sophisticated symbolic-connectionist model of structure mapping that employs a distributed representation of objects and predicates. Most other relevant reasoning models use other methods to perform mapping and are incapable of solving many classes of analogical reasoning problems that can be solved by the present invention.

(4) Description of Various Aspects

To assist a reader in understanding SHAAR's operations, SHAAR uses naming conventions in its network structure. FIG. 3 depicts the naming conventions assigned to various nodes. As can be appreciated by one skilled in the art, the naming conventions used herein are for illustrative purposes only and can be changed so long as they nodes they represent perform similar functions as described herein and are entities capable of having activation.

SHAAR handles information in the form of propositional statements, or predicate calculus. The model can reason about objects that enter into arbitrarily complex relations (relations with one or many arguments) and allows relations to hold between propositions, as well. The ability to represent and reason about nested propositions (relations between relations, or facts about facts) greatly extends SHAAR's abilities. The general logic of predicate calculus is reflected in the network architecture of the model.

Statements in predicate calculus are composed of symbols, and these symbols maintain their individual meanings across any statement into which they enter. That is, the meaning of the individual symbols is independent of the larger statement they comprise. As such, SHAAR employs nodes that represent objects 300 and predicates 302 independently of how these are bound together (these nodes are called OP units 304, with OP standing for Object/Predicate). For example, the statement "John loves Mary" employs units representing "John," "lover," "Mary," and "beloved." These are the same units that would be involved in the statement "Mary loves John," and they are a subset of the units that would comprise the statement "John and Mary love spaghetti." The instantiation of independent representations of objects and predicates is crucial to performing abstract relational reasoning, inference, and learning. However, it is not the only requirement.

SHAAR also builds units that correspond to complete propositional statements (Prop units 306). The instantiation of a single "handle" for each complete statement enables SHAAR to (1) act upon entire statements via this "handle," and (2) use propositional statements as arguments for other statements. Both of these are useful during reasoning and inference.

Note that the existence of Prop units 306 and OP units 304 is insufficient to completely capture statements in predicate calculus. Humans do not routinely use symbols that indicate which arguments play which roles in a relation, instead they rely on the order in which arguments are listed. Because a network has no notion of written order, some other mechanism must provide explicit, unambiguous information about the roles played by the various arguments of a proposition.

Given a set of symbols (OP units 304) that may be formed into a propositional statement (Prop units 306), SHAAR needs to bind the appropriate objects to the roles they play in that statement. SHAAR creates explicit (conjunctive) representations of role-filler bindings. These conjunctive units are called Sub-Propositions (SP units 308). If the network includes a proposition "John loves Mary," then the explicit role-filler bindings that are comprised by that statement are "John"+"lover" and "Mary"+"beloved." SHAAR creates SP units 308 one level above the OP units 304 in the network hierarchy, which have links to the appropriate OP units 304 being bound. Any proposition utilizes a set of SP units 308, one for each argument entering into the proposition.

The components of a single propositional statement are all made explicit as part of SHAAR's network representation. At the top level are Prop units 306, which represent conjunctions of SP units 308, one level down. SP units 308, in turn, represent conjunctions of OP units 304 (specifically, each SP unit 308 is a conjunction of one predicate unit 302 and its argument-an object 300 or Prop unit 306). OP units 304 represent conjunctions of semantic units 310 that describe the content or features of the OP units 304. The semantic units 310 include predicate semantic nodes 312 and object semantic nodes 314. Semantic units 310 are discussed in further detail below.

(4.1) Non-Temporal Activation Multiplexing

Artificial neural networks, like their biological ancestors, typically learn by changing the weights of connections among processing units. That is, neural network learning takes place in specific locations: connections between specific processing units are adjusted. If a network is to learn about an object "Bill," then connections to the unit or set of units representing "Bill" are modified.

Because neural learning occurs at specific locations, it is necessary to consistently represent objects (and other symbols) on the same unit or set of units. "Bill" should be represented by the same set of neurons, regardless of the context. If "Bill" is not represented on the same set of units, then information learned about Bill in one context will not generalize to "Bill" in a second context (if "Bill" is represented in two different locations, there is no way to transfer neural learning across space).

Other analogical reasoning systems, such as Learning and Inference with Schemas and Analogies (LISA), use synchrony of neural firing to encode information about the roles being played by the objects in any specific situation. For example, "Bill" is represented in the same way whether he is jumping or running, but the temporal pattern of firing is such that the "Bill" neurons fire in synch with "Jumping" neurons in the former case, and "Running" neurons in the latter.

While LISA's solution is neurally plausible (indeed, neural plausibility is a must for psychological models), in the artificial intelligence (AI) context there are several drawbacks to this temporal "multiplexing." Notably, two performance limitations fall out of temporal binding: limited capacity working memory and long processing times that increase substantially with network size. The SHAAR model avoids these neural plausibility limitations of LISA.

SHAAR employs a non-temporal multiplexing strategy by using a solution akin to signature firing for different role-filler bindings. Each neuron in SHAAR stores a vector of activations. Each entry in this vector may be thought of as the activation of the neuron on a separate time step (though all the activations are present simultaneously). Models like LISA modify connections between neurons as a function of the correlation of neural activations over time (implementing a Hebbian learning rule). SHAAR, on the other hand, modifies connection weights as a function of the correlation of neural activations over the activation vector (i.e., each position in the activation vector corresponds to exactly one SubProp in the source analogs. The order is not important as long as it is consistent throughout the network). As such, it is more efficient than LISA and similar systems. Models that integrate over time must necessarily traverse the network on many time steps, updating activations and calculating correlations. SHAAR traverses its network very few times, essentially running all time acts in parallel.

Even though SHAAR has traded synchrony of firing for a more efficient, non-temporal multiplexing strategy, there is an important sense in which SHAAR has adapted the strategy of using activation to represent bindings from LISA's architecture. Specifically, while it is fine to run many time acts in parallel, this is only possible if there is a way to predict which units will be active on any one time step. In addition, if the state of the network is generally predictable, it must also carry the proper binding information. Binding information is whatever indexing or symbolic scheme is necessary to link semantically similar units. In LISA, it is synchrony of firing (i.e., peak activation); while in SHAAR, it is activation in corresponding frequencies or activation slots.

In the LISA model, the oscillations that lead to appropriate temporal synchrony are controlled by a gating mechanism inside the various SP nodes. Allowing SPs to control the temporal pattern of firing results in each SP unit 308 and the predicate unit 302 and object unit 300 (or Prop unit 306) attached to that SP unit 308 firing in unison. Conversely, SHAAR uses scalar products between activation vectors to accomplish similar binding results. Both models are similar in that sub props in the source analog control the initiation of activation.

(4.2) Controlled Activation Flow

In SHAAR, the distribution of activation on different "frequencies" of the activation vector is not an inherent property of the network. As a result, it is important that the flow of activation in SHAAR be carefully controlled so that the correct activation vectors are instantiated in the correct nodes.

Fortunately, a general solution to controlling activation exists so that SHAAR can autonomously manage activation flow in any network it can represent. The activation in SHAAR's network originates in the SP units 308 and is allowed to flow out from SP units 308. SP units 308 in the source analog do not accept input.

Figure 4A:
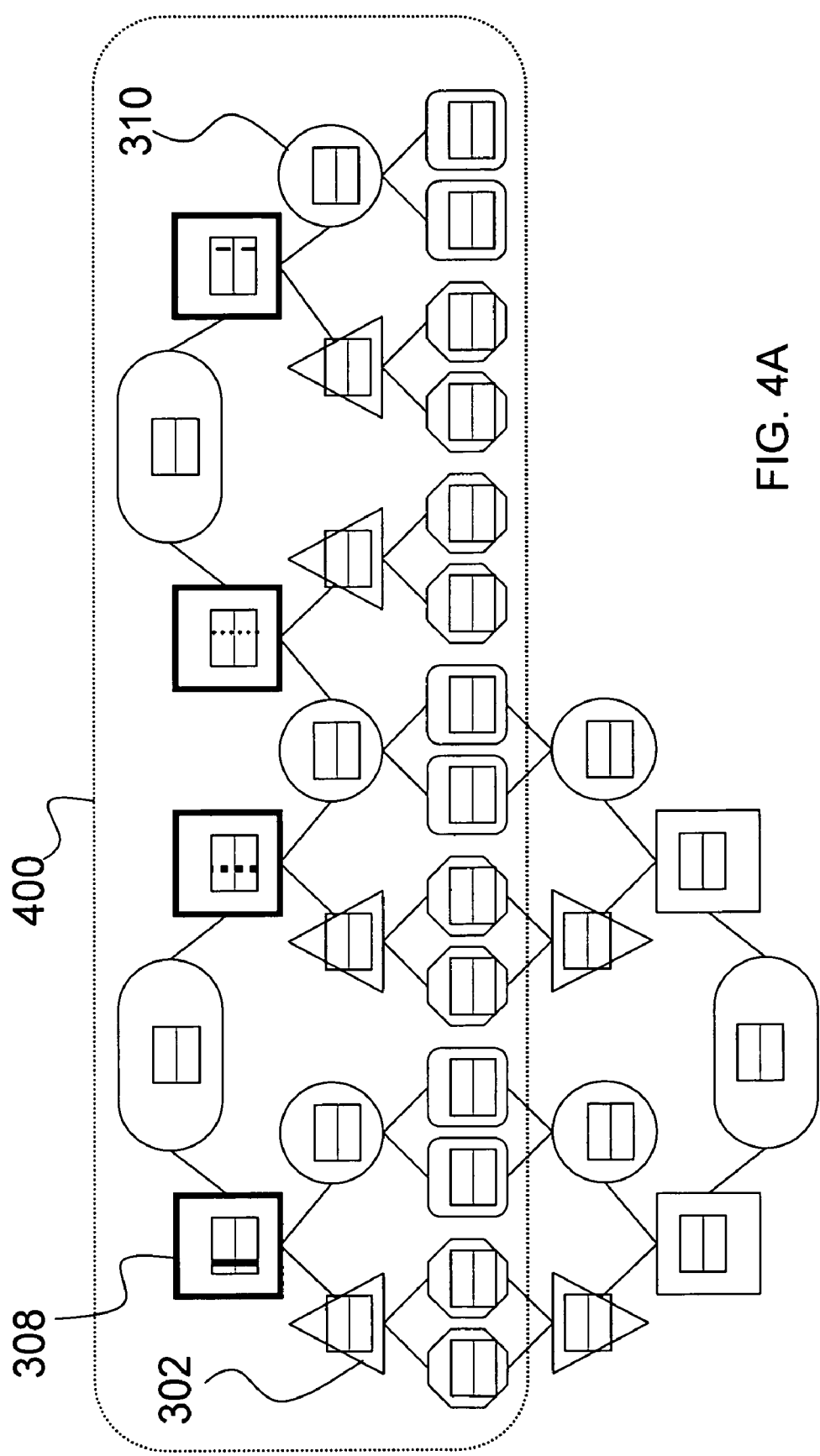
FIG. 4A is an illustration of an act in the Semantic-based Hybrid Architecture for Analogical Reasoning (SHAAR) algorithm, where sub-propositions (SP units) in a source analog are activated.

FIG. 4A illustrates the first act in the SHAAR algorithm, where the sub-propositions 308 in a source analog 400 are activated. For example, each SP unit 308 is initialized with activation on a unique frequency. SHAAR activation propagation is partial. Activations are only passed between nodes that share specific relationships throughout the reasoning process. In other words, the SHAAR algorithm counts the total number of SP units 308 in all source analogs. SHAAR then creates an activation vector of that size for every node in the network, as needed. Thereafter, SHAAR loops over each SP unit 308, assigning a user defined activation value (usually 1.0) in exactly one unique slot in that SP unit's 308 activation vector. Aligning all of the SP units 308 in a column produces an identity matrix, by definition:

| Name | Activation |
|------|------------|
| SP1 | [1 0 0 0] |
| SP2 | [0 1 0 0] |
| SP3 | [0 0 1 0] |
| SP4 | [0 0 0 1] |

Figure 4B:
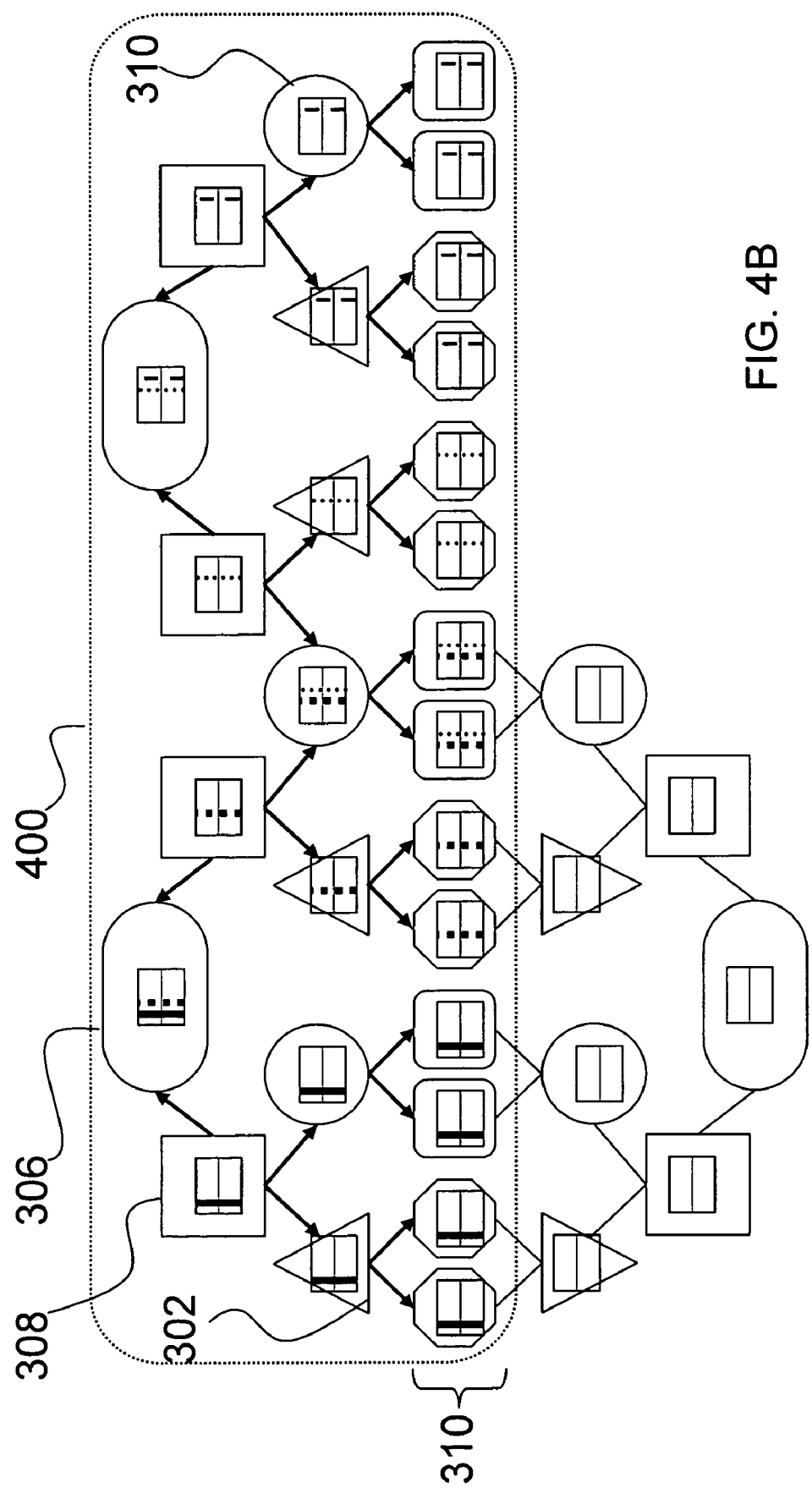
FIG. 4B is an illustration of an act in the SHAAR algorithm, where activity is propagated out from the SP units to the proposition units (Prop units) and semantic units in the source analog.

As shown in FIG. 4B, the activity is then propagated out from the SP units 308 to the Prop units 306 and semantic units 310 in the source analog 400. Each frequency is propagated independently such that nodes may receive activation on multiple frequencies.

Figure 5:
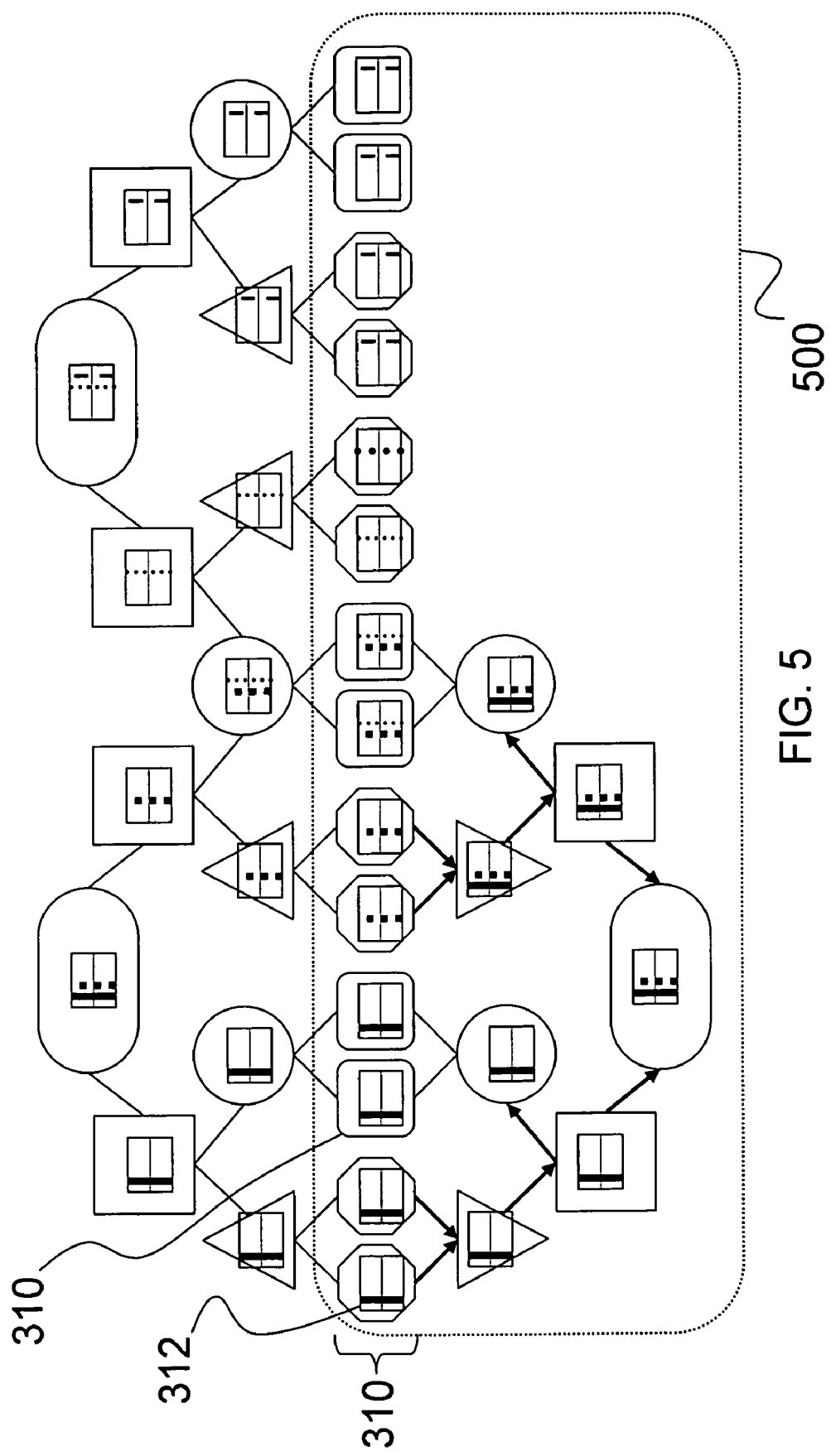
FIG. 5 is an illustration of another act in the SHAAR algorithm, where activation is propagated out from the semantic units to the nodes in a target analog.
Figure 6:
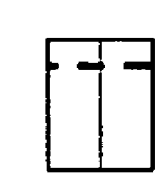
FIG. 6 is an illustration of a correlation algorithm using exemplary data, showing that the correlation between two nodes is the scalar product of their activation vectors.

FIG. 5 illustrates the second act in the SHAAR algorithm, where activation is propagated out from the semantic units 310 to the nodes in the target analog 500. First, only predicate semantics 312 are allowed to pass activation as shown in FIG. 5. Later, activation in the target analog 500 is cleared and only object semantics 314 are allowed to pass activation (4.3) Activation Correlation Hebbian learning algorithms are simple. The connection strengths between units that fire together in time increase over the course of learning. Because SHAAR employs multiplexing across its activation vectors, the equivalent of Hebbian learning may occur as a single vector operation. The activation vectors of two units may be multiplied (or correlated), the result used to adjust the strength of the connection between them. The resulting activation on a node is the sum of all contributing input nodes normalized by the max value after all inputs are evaluated. FIG. 6 illustrates the correlation algorithm using exemplary data, specifically showing that the correlation between two nodes is the scalar product of their activation vectors.

To calculate the similarity of the activation vectors on two units, SHAAR sums the products of each entry according to the following:

$$S(i,j) = \Sigma A_i(n) A_j(n), \tag{1}$$

where $A_i(n)$ and $A_j(n)$ are the activation values of units i and j, respectively, on the entry n. SHAAR determines the activation vector for each unit in the network in terms of the role-filler bindings in which each neuron participates. For example, if the network represents the proposition "John runs," then the units representing "John" and "runner" must be bound together by virtue of sharing similar activation vectors.

(4.4) Mapping Algorithm

A fundamental goal of SHAAR is to find correspondences between a novel situation (a target problem) and a known situation (a source problem). These correspondences may stem from relational symmetries, object similarities, or a combination of the two. SHAAR looks for the best mapping connections by producing a matrix of unit correlations and accepting the strongest internally consistent set.

In each pass through the network, SHAAR begins by allowing a controlled flow of activation from the source analog to the target analog. Once activation vectors have been established in the target analog (as shown in FIG. 5), SHAAR begins calculating correspondences. Each unit in the source analog is restricted to correspond with a unit in the target analog of the same type. Determining which specific target unit best corresponds to units in the source analog requires a comparison of the evidence for various mappings.

Figure 7:
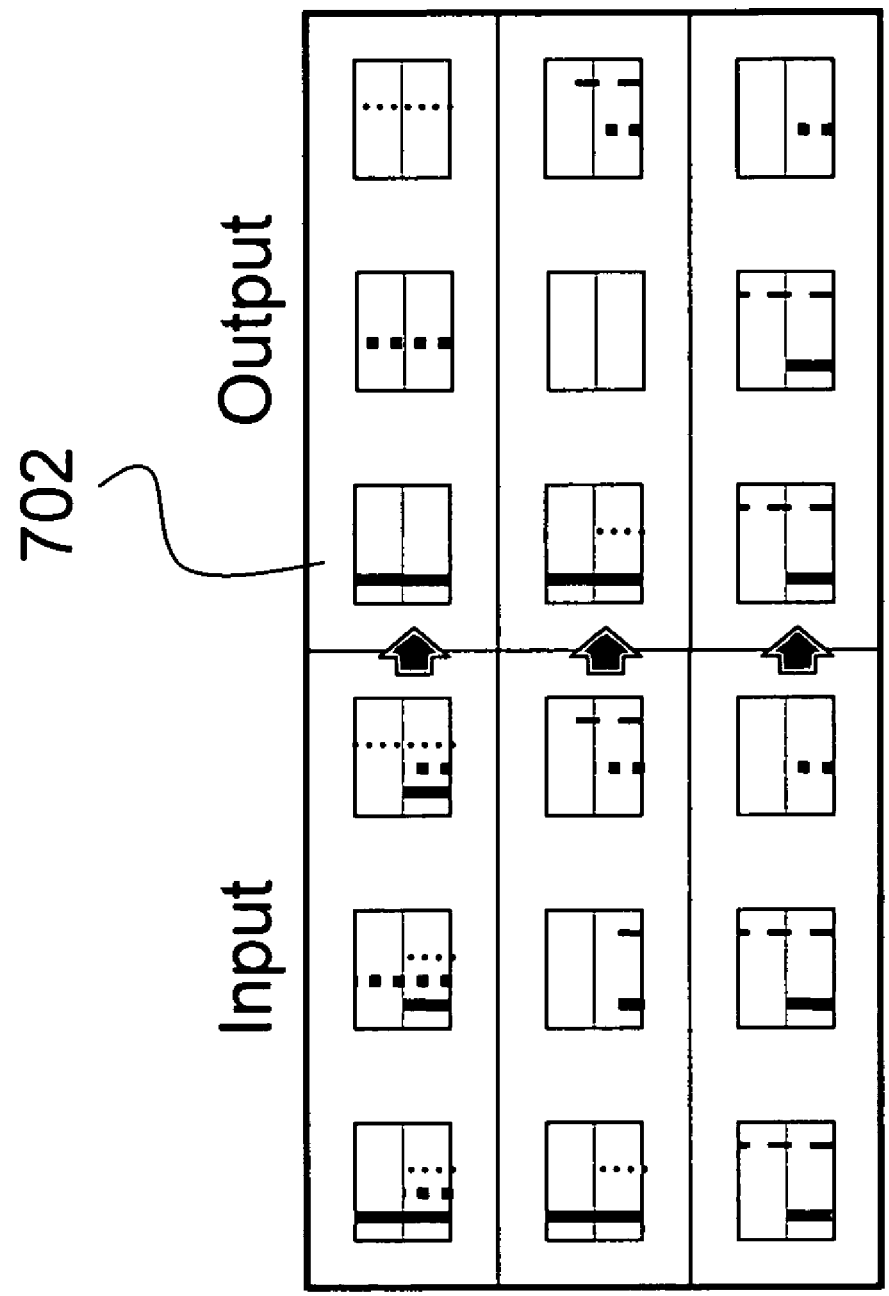
FIG. 7 is an illustration of a matrix of relative strengths of evidence for various correspondences, showing competition among sets of nodes.

SHAAR calculates a matrix of raw correspondences by multiplying the activation vectors of every pair of units that may map. Each entry in the matrix $C_R$ is the result of a multiplication of activation vectors from two units:

$$C_R(i,j) = \Sigma A_i(n) A_j(n), \quad (2)$$

where $A_i(n)$ and $A_j(n)$ are the activation values of units i and j, respectively, on the entry n. As can be appreciated by one skilled in the art, equation 1 introduces a metric of similarity between two nodes, while equation 2 applies this metric to a specific situation, such that $C_R$ is an instance of S. As shown in FIG. 7, once this matrix is calculated, the entries are competitively normalized to get a matrix of relative strengths of evidence for various correspondences (i.e., matrix $C_N$ 702).

The entries of matrix $C_N$ 702 are calculated by dividing each entry in matrix $C_R$ by the maximum entry in its row or column. That is:

$$C_N(i,j) = C_R(i,j) / [\max(C_R(\bullet,j), C_R(i,\bullet))], \quad (3)$$

where $\bullet$ denotes "for all valid indices" (e.g., "for all i" and "for all j" in these two instances) and max( ) is a function that returns the larger of all its arguments, such that the expression $\max(C_R(\bullet,j), C_R(i,\bullet))$ denotes returning the largest value in both the current column and row. As a non-limiting example, $$\text{if } C_R = \begin{matrix} & i \\ & \# 5 \# \# \\ j & 3\ 6\ 7\ 2 \\ & \# 9 \# \# \\ & \# 1 \# \#, \end{matrix}$$

then the expression evaluates to 9 because 9 is the largest value in both column i and row j.

As mentioned above, SHAAR considers both object similarities and relational similarities between the source and target. To this end, SHAAR makes two passes through the mapping algorithm, each time generating a matrix of unit correlations. One pass generates a correspondence matrix based on the objects that are present in the source and target, while the other pass generates a correspondence matrix based on the predicates that are played in the source and target analogs. The latter pass is more faithful to the traditional definition of analogy. However, object correspondences are sometimes useful and informative, so SHAAR calculates these, as well.

For each unit type (i.e., Prop units, SP units, OP units, semantic units), a matrix $C_N$ is calculated for each of the two passes through the network. On one pass, activation flows from the source to the target through object semantic units only. On the other pass, activation flows through predicate semantic units only. As such, for each unit type, we have a matrix $OC_N$ (activation flows through object semantics) and $PC_N$ (activation flows through predicate semantics) calculated as above.

To determine which correspondences between source and target are the best based on both object similarity and propositional structure, SHAAR takes a weighted average of $OC_N$ and $PC_N$ according to the following:

$$\text{All}C_R = \alpha OC_N + \beta PC_N, \quad (4)$$

where $\alpha$ and $\beta$ are weight parameters in the range [0,1].

Once calculated, the composite matrix is normalized, just as were each of its constituent matrices. The resulting matrix, $\text{All}C_N$, finally determines the correspondences that are chosen.

$$\text{All}C_N(i,j) = \text{All}C_R(i,j) / [\max(\text{All}C_R(\bullet,j), \text{All}C_R(i,\bullet))]. \quad (5)$$

At this time, SHAAR makes no considerations of the overall pattern of correspondences across different unit types. That is, the evidence for SP unit mappings does not influence the choice of object unit mappings.

As can be appreciated by one skilled in the art, if a single pass is performed, such as through predicate semantics only, then $\alpha$ is 0 and $\text{All}C_R = PC_N$. Thus, in equation five, $\text{All}C_R$ can be replaced with $PC_N$. Alternatively, if a single pass is performed through object semantics only, then $\beta = 0$ and $\text{All}C_R = OC_N$.

(4.5) Inference and Learning

Analogical inference takes place when SHAAR discovers a set of correspondences between a source and target that does not account for all of the structures in the source analog. SHAAR then inferedly generates new predicates and objects in the target analog for any unmapped in the source analog, thereby inferring a solution in the target analog.

(4.6) Schema Induction

Human knowledge structures do not seem to be tied to specific episodes. That is, humans have abstract or schematic knowledge about the world that does not contain a specific spatio-temporal context. Psychologists seek to understand how such knowledge is constructed from experience, and SHAAR implements a schema-induction strategy that draws on psychological research and prior modeling work.

In brief, the schema induction process in SHAAR is an extension of the inference mechanism. However, where inferences serve to enrich a representation that is incomplete, induction generates an entirely new representation.

If, for example, SHAAR was used to find a mapping in the "John" and "Mary" problem (described above), the model could induce an abstract schema describing the common structure of the two analogs and store it as a new situation.

SHAAR, like LISA, licenses inference when a unit in the source problem does not have a corresponding unit in the target problem. SHAAR takes this to mean that the target problem is lacking information that can be gleaned from the source. As a result, SHAAR creates a unit in the target analog of the appropriate type, builds a mapping connection to the source object prompting the inference, and then connects the new object to the rest of the target analog's structures.

When SHAAR is provided with an empty analog as a target problem, all units in the source will be without correspondences in the target, and so an entire analog will be inferred. Crucially, when SHAAR is given one source problem, one incomplete target, and one empty target, inference and induction may occur together.

(4.8) Act-Wise Illustrations

For further illustration, FIGS. 8 through 37 illustrate acts in the analogical reasoning system. FIG. 8 illustrates the activation of SP units 308 in the source analog, with activity being propagated out to Prop units 306 and semantic units 310 in the source analog 400. FIG. 9 illustrates the propagation of activity received from the source analog out from the predicate semantics 312 in the target analog 500.

FIG. 10 illustrates how the SHAAR algorithm computes correlations for predicates 302 in the source analog and predicates 302' in the target analog based upon the predicate semantics alone. FIG. 11 illustrates how the SHAAR algorithm computes correlations for objects 300 in the source analog and objects 300' in the target analogs due to predicate semantics alone.

After the above correlations are computed, the activity in the target analog 500 is cleared, as shown in FIG. 12. Thereafter, as shown in FIG. 13, the SHAAR algorithm propagates the activity received from the source analog out from the object semantic units 314 in the target analog 500. FIG. 14 illustrates how the SHAAR algorithm computes correlations for predicates 302 in the source and predicates 302' in the target analogs due to object semantics alone. FIG. 15 illustrates the correlation for objects 300 in the source analogs and objects 300' in the target analogs due to object semantics alone.

FIG. 16 illustrates various correlation mappings and the combined mapping results of correlating due to object and predicate semantics. FIG. 17 illustrates how SHAAR competitively selects single mappings between the source analog and the target analog of like kind OP unit nodes, mapping predicates 302 in the source analogs to predicates 302' in the target analogs, and objects 300 in the source analogs to objects 300' in the source analogs.

FIG. 18 illustrates how SHAAR infers new predicates 302" and objects 300" in the target analog for any unmapped in the source analog. As can be appreciated by one skilled in the art and as used throughout the figures, ### denotes a unit in the source analog, ###' denotes a corresponding unit in the target analog, and ###" denotes a corresponding inferred unit in the source analog. FIG. 19 illustrates the activation of the target analog 500 through all of the new mappings.

FIG. 20 illustrates how SHAAR algorithm computes the correlations for SP units 308 in source analogs and SP units 308' target analogs. FIG. 21 illustrates how SHAAR competitively selects single mappings between the source analog and the target analog, with SP units 308 mapped to SP units 308'. FIG. 22 illustrates the inference of new SP units 308" in the target analog for any unmapped SP units 308 in the source analog. FIG. 23 illustrates the activation of the target analog 500 through all of the new mappings.

Figure 24:
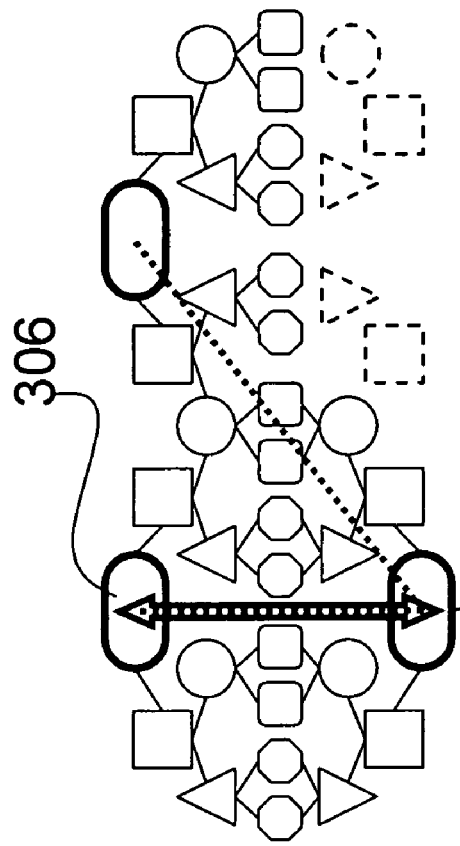
FIG. 24 is an illustration of an act in the SHAAR algorithm, illustrating how the SHAAR algorithm computes the correlations for Prop units between the source and target analogs.
Figure 25:
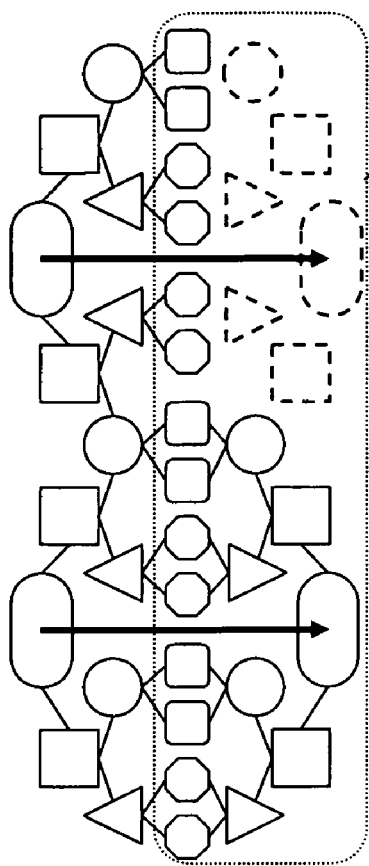
FIG. 25 is an illustration of an act in the SHAAR algorithm, illustrating how SHAAR competitively selects single mappings between the source analog and the target analog, with Prop units mapped to Prop units.
Figure 26:
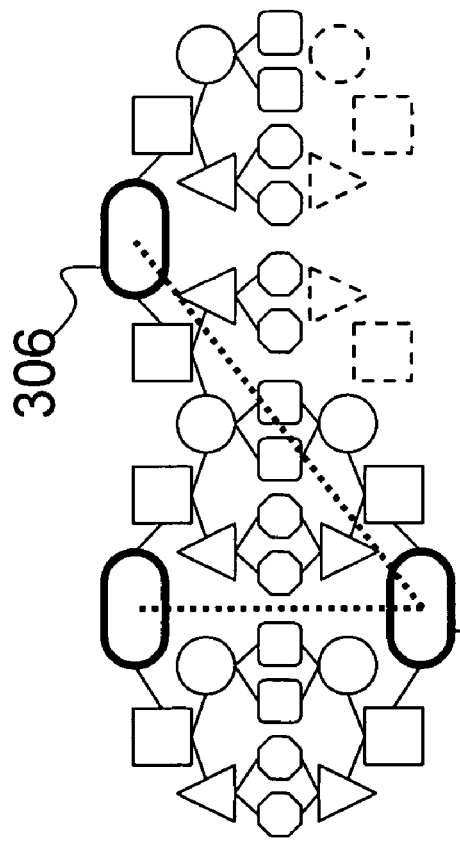
FIG. 26 is an illustration of an act in the SHAAR algorithm, illustrating the inference of new Prop units in the target analog for any unmapped Prop units in the source analog.
Figure 27:
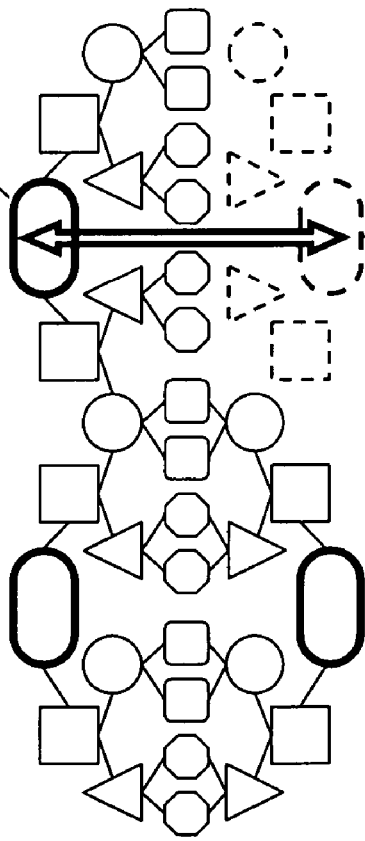
FIG. 27 is an illustration of an act in the SHAAR algorithm, illustrating the activation of the target analog through all of the new mappings.

FIG. 24 illustrates how SHAAR algorithm computes the correlations for Prop units 306 in the source analogs and Prop units 306' in the target analogs. FIG. 25 illustrates how SHAAR competitively selects single mappings between the source analog and the target analog, with Prop units 306 mapped to Prop units 306'. FIG. 26 illustrates the inference of new Prop units 306" in the target analog for any unmapped Prop units 306 in the source analog. FIG. 27 illustrates the activation of the target analog 500 through all of the new mappings.

Figure 29:
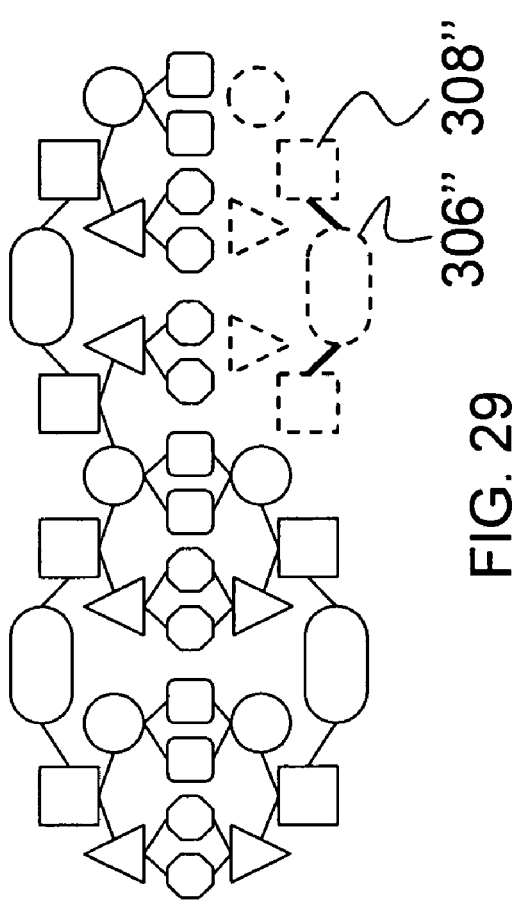
FIG. 29 is an illustration of an act in the SHAAR algorithm, illustrating how SHAAR competitively connects Prop units to SP units when correlation strengths are greater than or equal to a predetermined threshold.
Figure 28:
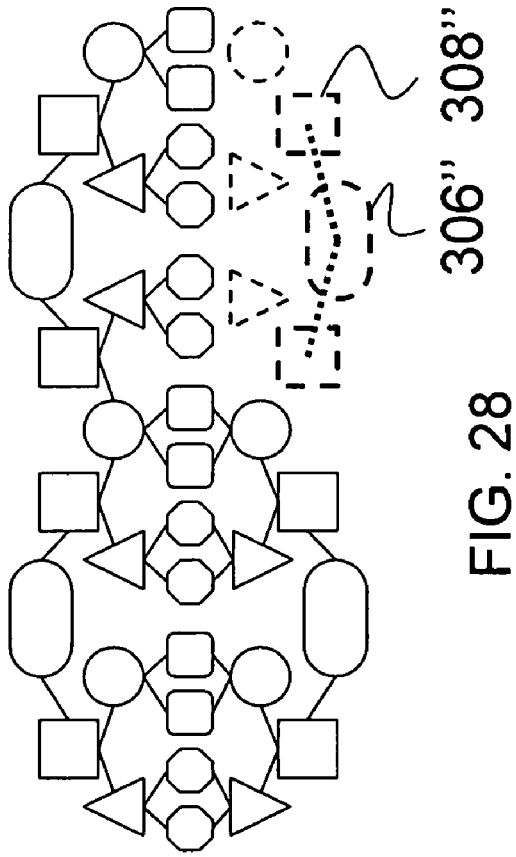
FIG. 28 is an illustration of an act in the SHAAR algorithm, illustrating how the SHARR algorithm computes the correlations between inferred Prop units and inferred SP units in the target analog.

FIG. 28 illustrates how the SHARR algorithm computes the correlations between inferred Prop units 306" and inferred SP units 308" in the target analog (i.e., finding parents of inferred SP units 308'). FIG. 29 illustrates how SHAAR competitively connects inferred Prop units 306" to inferred SP units 308" when correlation strengths are greater than or equal to a predetermined threshold.

Figure 31:
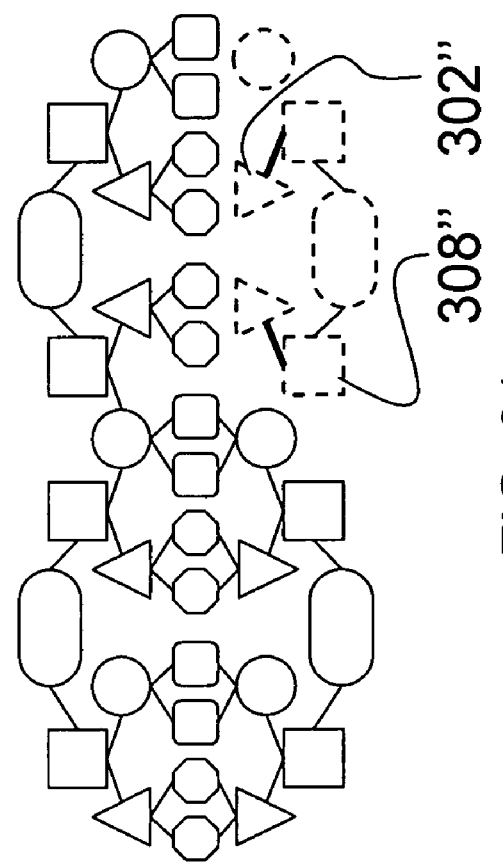
FIG. 31 illustrates how SHAAR competitively connects SP units to predicates when correlation strengths are greater than or equal to a predetermined threshold.
Figure 30:
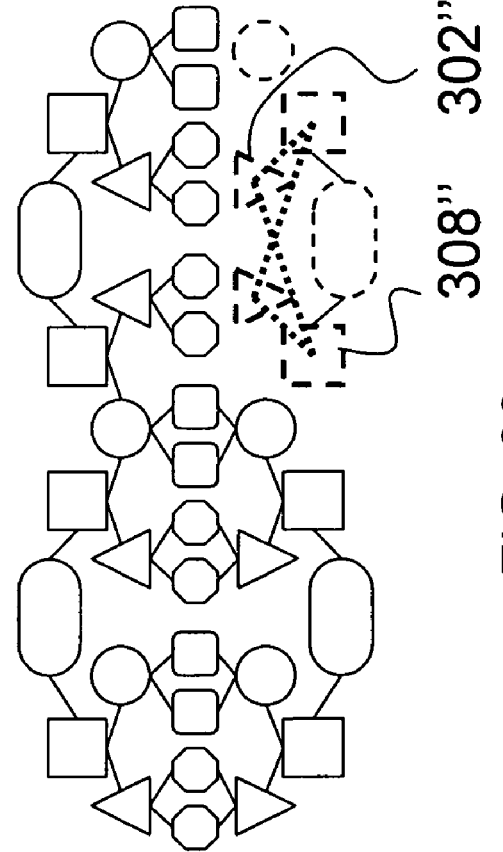
FIG. 30 is an illustration of an act in the SHAAR algorithm, illustrating how the SHAAR algorithm computes the correlations between inferred SP units and inferred predicates in the target analog.

FIG. 30 illustrates how the SHAAR algorithm computes the correlations between inferred SP units 308" and inferred predicates 302" in the target analog (i.e., finding children of the inferred SP units 308"). FIG. 31 illustrates how SHAAR competitively connects inferred SP units 308" to inferred predicates 302" when correlation strengths are greater than or equal to a predetermined threshold.

FIG. 32 illustrates how the SHAAR algorithm computes the correlations between inferred SP units 308" and all Prop units 306' and objects 300' (or inferred objects 300") in the target analog (i.e., finding children of the inferred SP units 308"). FIG. 33 illustrates how SHAAR competitively connects inferred SP units 308" to the inferred Prop units 306" or objects 300' (or 300") when correlation strengths are greater than or equal to a predetermined threshold.

FIG. 34 illustrates how the SHAAR algorithm computes the correlations between inferred predicates 302' and all predicate semantic units 312 in the target analog. FIG. 35 illustrates how SHAAR connects predicates 302' to predicate semantic units 312 when correlation strengths are greater than or equal to a predetermined threshold.

FIG. 36 illustrates how the SHAAR algorithm computes the correlations between inferred objects 300" and all object semantic units 314 in the target analog. Finally, FIG. 37 illustrates how SHAAR connects inferred objects 300" to object semantic units 314 when correlation strengths are greater than or equal to a predetermined threshold. After performing the above acts, a collection of the inferred object nodes, inferred predicate nodes, inferred SP units and inferred Prop units provides a user with a solution to the target analog.

What is claimed is:

1. A computerized system for analogical reasoning, comprising a data processor having a neural network that is configured to perform symbolic substitution by finding a correspondence between a target analog and a source analog to infer a solution to the target analog based on the source analog;

wherein each of the source analog and the target analog includes a plurality of nodes in the form of:

object/predicate units (OP units), where OP units are nodes that represent object nodes and predicate nodes independently of how they are bound together;

proposition units (Prop units), where Prop units are nodes that correspond to complete propositional statements to form a relational structure, sub-proposition units (SP units), where SP units are nodes that represent sub-proposition units that are conjunctive representations of role-filler bindings, binding predicate nodes to object nodes; and semantic units, where semantic units are nodes in a semantic domain that relate to a corresponding predicate node and object node, forming predicate semantic nodes and object semantic nodes respectively, where semantic units represent the meaningfulness of predicate and object nodes and the degree of similarity between multiple predicate nodes or multiple object nodes, and where the source analog and the target analog share the same semantic domain with at least some shared semantic units.

2. A system for analogical reasoning as set forth in claim 1, wherein the neural network is configured to perform the following operations:

activate the SP units in the source analog and propagate activity to the Prop units and the semantic units in the source analog;

propagate activity received from the SP units of the source analog from the semantic units in the target analog to at least one of the SP units, OP units, and Prop units in the target analog;

compute correlations for the OP units between the source analog and the target analog due to the semantic units;

combine correlations due to the semantic units;

competitively select single mappings between the source analog and the target analog of like kind OP unit nodes;

inferedly generate new inferred predicate nodes and inferred object nodes in the target analog for any that are unmapped in the source analog;

activate the target analog through the single mappings;
compute correlations for the SP units between the source analog and the target analog;
competitively select single mappings between the source analog and the target analog for the SP unit nodes;
inferedly generate new inferred SP unit nodes in the target analog for any that are unmapped in the source analog;
activate the target analog through all new single mappings;
compute correlations for the Prop units between the source analog and the target analog;
competitively select single mappings between the source analog and the target analog for the Prop units;
inferedly generate new inferred Prop unit nodes in the target analog for any that are unmapped in the source analog;
activate the target analog through all new single mappings;
compute correlations between inferred Prop units and inferred SP units in the target analog to find parents for the inferred SP units;
competitively connect the inferred Prop units to the inferred SP units when correlation strengths are greater than or equal to a predetermined threshold;
compute correlations between the inferred SP units and the inferred predicate nodes in the target analog to find children of the inferred SP units;
competitively connect the inferred SP units to predicate nodes when correlation strengths are greater than or equal to a predetermined threshold;
compute correlations between the inferred SP units and all the Prop units and object nodes in the target analog to find children of the SP units;
competitively connect the inferred SP units to Prop units or object nodes when correlation strengths are greater than or equal to a predetermined threshold;
compute correlations between inferred predicate nodes and all predicate semantic units in the target analog;
competitively connect inferred predicate nodes to predicate semantics when correlation strengths are greater than or equal to a predetermined threshold;
compute correlations between the inferred object nodes and all object semantic units in the target analog; and
competitively connect inferred object nodes to object semantic units when correlation strengths are greater than or equal to a predetermined threshold, whereby a collection of the inferred object nodes, inferred predicate nodes, inferred SP units and inferred Prop units provides a user with a solution to the target analog.

3. A system for analogical reasoning as set forth in claim 2, wherein when activating the SP units in the source analog and propagating activity out to the Prop units and the semantic units, the neural network is further configured to perform the following operations:

initialize each SP unit with activation on a unique frequency, where activations are only passed to adjacent connected nodes, such that activations are passed in the source analog from SP units to Prop units, SP units to OP units, and OP units to semantic units, and where the activations are passed in the target analog from semantic units to OP units, OP units to SP units, and SP units to Prop units; and propagate activation out from the SP units to the semantic units in the source analog, where each frequency is propagated independently such that semantic unit nodes receive activation on multiple frequencies.

4. A system for analogical reasoning as set forth in claim 3, wherein when computing correlations for the OP units between the source analog and the target analog due to the semantic units, and when combining the results of correlating due to the semantic units, the neural network is further configured to perform the following operations:

propagate activity received from SP units of the source analog from the predicate semantic nodes in the target analog;
compute correlations for the predicate nodes between the source analog and target analog due to the predicate semantic nodes alone;
compute correlations for the object nodes between the source analog and the target analog due to predicate semantic nodes alone;
clear activity in the target analog;
propagate activity received from the SP units of the source analog from the object semantic nodes in the target analog;
compute correlations for the predicate nodes between the source analog and the target analog due to the object semantic nodes alone;
compute correlations for the object nodes between the source analog and the target analog due to the object semantic nodes alone; and
combine results from correlating due to object semantics and predicate semantics.

5. A system for analogical reasoning as set forth in claim 4, wherein when computing correlations, the neural network is configured to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units that are being correlated, according to the following:

$$C_R(i,j) = \Sigma A_i(n) A_j(n),$$

where $A_i(n)$ and $A_j(n)$ are activation values of units i and j, respectively, on entry n;
and where matrix $C_N$ is calculated by dividing each entry in $C_R$ by the maximum entry in its row or column, according to the following:

$$C_N(i,j) = C_R(i,j) / [\max(C_R(\bullet,j), C_R(i,\bullet))],$$

wherein for at least one of the semantic units, SP units, Prop units, and OP units, a matrix $C_N$ is calculated for each of two passes through the neural network, wherein in one pass, activation flows from the source analog to the target analog through object semantic units, resulting in matrix $OC_N$, and wherein in another pass, activation flows through predicate semantic units, resulting in matrix $PC_N$.

6. The system of claim 5, wherein when combining the results from correlating due to object semantics and predicate semantics, the neural network is further configured to determine which correspondences between the source analog and the target analog are the best by forming a composite matrix ($AllC_R$), the matrix $AllC_R$ being formed by calculating a weighted average of $OC_N$ and $PC_N$ according to the following:

$$AllC_R = \alpha OC_N + \beta PC_N,$$

where $\alpha$ and $\beta$ are weight parameters between the range [0,1], and where once calculated, the composite matrix is normalized to create a resulting matrix ($AllC_N$) that determines the correspondences that are chosen, where the matrix $AllC_N$ is calculated according to the following:

$$AllC_N(i,j) = AllC_R(i,j) / [\max(AllC_R(\bullet,j), AllC_R(i,\bullet))].$$

7. A system for analogical reasoning as set forth in claim 3, wherein when computing correlations for the OP units between the source analog and the target analog due to the semantic units, and when combining the results of correlating due to the semantic units, the neural network is further configured to perform the following operations:
 propagate activity received from the SP units in the source analog from the predicate semantic nodes in the target analog;
 compute correlations for the predicate nodes between the source analog and target analog due to the predicate semantic nodes alone;
 compute correlations for the object nodes between the source analog and the target analog due to predicate semantic nodes alone;
 combine results from the correlations.

8. A system for analogical reasoning as set forth in claim 7, wherein when computing correlations, the neural network is configured to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units (i.e., nodes) that are being correlated, according to the following:

$$C_R(i,j) = \Sigma A_i(n) A_j(n),$$

where $A_i(n)$ and $A_j(n)$ are activation values of units i and j, respectively, on entry n;
and where matrix $C_N$ is calculated by dividing each entry in $C_R$ by the maximum entry in its row or column, according to the following:

$$C_N(i,j) = C_R(i,j) / [\max(C_R(\bullet,j), C_R(i,\bullet))],$$

wherein for at least one of the semantic units, SP units, Prop units, and OP units, a matrix $C_N$ is calculated where activation flows through predicate semantic nodes, resulting in matrix $PC_N$.

9. The system of claim 8, wherein when combining the results from correlating, the neural network is further configured to determine which correspondences between the source analog and the target analog are the best by creating a matrix ($AllC_N$) that determines the correspondences that are chosen, where the matrix $AllC_N$ is calculated according to the following:

$$AllC_N(i,j) = PC_N(i,j) / [\max(PC_N(\bullet,j), PC_N(i,\bullet))].$$

10. A system for analogical reasoning as set forth in claim 3, wherein when computing correlations for the OP units between the source analog and the target analog due to the semantic units, and when combining the results of correlating due to the semantic units, the neural network is further configured to perform the following operations:
 propagate activity received from the source analog out from the object semantic nodes in the target analog;
 compute correlations for the predicate nodes between the source analog and the target analog due to the object semantic nodes alone;
 compute correlations for the object nodes between the source analog and the target analog due to the object semantic nodes alone; and
 combine results from the correlations.

11. A system for analogical reasoning as set forth in claim 10, wherein when computing correlations, the neural network is configured to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units (nodes) that are being correlated, according to the following:

$$C_R(i,j) = \Sigma A_i(n) A_j(n),$$

where $A_i(n)$ and $A_j(n)$ are activation values of units i and j, respectively, on entry n;
and where matrix $C_N$ is calculated by dividing each entry in $C_R$ by the maximum entry in its row or column, according to the following:

$$C_N(i,j) = C_R(i,j) / [\max(C_R(\bullet,j), C_R(i,\bullet))],$$

wherein for at least one of the semantic units, SP units, Prop units, and OP units, a matrix $C_N$ is calculated where activation flows through object semantic nodes, resulting in matrix $OC_N$.

12. The system of claim 11, wherein when combining the results from correlating, the neural network is further configured to determine which correspondences between the source analog and the target analog are the best by creating a matrix ($AllC_N$) that determines the correspondences that are chosen, where the matrix $AllC_N$ is calculated according to the following:

$$AllC_N(i,j) = OC_N(i,j) / [\max(OC_N(\bullet,j), OC_N(i,\bullet))].$$

13. A method for analogical reasoning, comprising an act of using a data processor having a neural network to perform an act of symbolic substitution by finding a correspondence between a target analog and a source analog to infer a solution to the target analog based on the source analog; and
 wherein in the act of act of using a data processor having a neural network to perform an act of symbolic substitution by finding a correspondence between a target analog and a source analog to infer a solution to the target analog based on the source analog, each of the source analog and the target analog includes a plurality of nodes in the form of:
 object/predicate units (OP units), where OP units are nodes that represent object nodes and predicate nodes independently of how they are bound together;
 proposition units (Prop units), where Prop units are nodes that correspond to complete propositional statements to form a relational structure,
 sub-proposition units (SP units), where SP units are nodes that represent sub-proposition units that are conjunctive representations of role-filler bindings, binding predicate nodes to object nodes; and
 semantic units, where semantic units are nodes in a semantic domain that relate to a corresponding predicate node and object node, forming predicate semantic nodes and object semantic nodes respectively, where semantic units represent the meaningfulness of predicate and object nodes and the degree of similarity between multiple predicate nodes or multiple object nodes,
 and where the source analog and the target analog share the same semantic domain with at least some shared semantic units.

14. A method for analogical reasoning as set forth in claim 13, further comprising acts of:
 activating the SP units in the source analog and propagate activity to the Prop units and the semantic units in the source analog;
 propagating activity received from the SP units of the source analog from the semantic units in the target analog to at least one of the SP units, OP units, and Prop units in the target analog;
 computing correlations for the OP units between the source analog and the target analog due to the semantic units;

combining correlations due to the semantic units;
competitively selecting single mappings between the source analog and the target analog of like kind OP unit nodes;
inferedly generating new inferred predicate nodes and inferred object nodes in the target analog for any that are unmapped in the source analog;
activating the target analog through the single mappings;
computing correlations for the SP units between the source analog and the target analog;
competitively selecting single mappings between the source analog and the target analog for the SP unit nodes;
inferedly generating new inferred SP unit nodes in the target analog for any that are unmapped in the source analog;
activating the target analog through all new single mappings;
computing correlations for the Prop units between the source analog and the target analog;
competitively selecting single mappings between the source analog and the target analog for the Prop units;
inferedly generating new inferred Prop unit nodes in the target analog for any that are unmapped in the source analog;
activating the target analog through all new single mappings;
computing correlations between inferred Prop units and inferred SP units in the target analog to find parents for the inferred SP units;
competitively connecting the inferred Prop units to the inferred SP units when correlation strengths are greater than or equal to a predetermined threshold;
computing correlations between the inferred SP units and the inferred predicate nodes in the target analog to find children of the inferred SP units;
competitively connecting the inferred SP units to predicate nodes when correlation strengths are greater than or equal to a predetermined threshold;
computing correlations between the inferred SP units and all the Prop units and object nodes in the target analog to find children of the SP units;
competitively connecting the inferred SP units to Prop units or object nodes when correlation strengths are greater than or equal to a predetermined threshold;
computing correlations between inferred predicate nodes and all predicate semantic units in the target analog;
competitively connecting inferred predicate nodes to predicate semantics when correlation strengths are greater than or equal to a predetermined threshold;
computing correlations between the inferred object nodes and all object semantic units in the target analog; and
competitively connecting inferred object nodes to object semantic units when correlation strengths are greater than or equal to a predetermined threshold, whereby a collection of the inferred object nodes, inferred predicate nodes, inferred SP units and inferred Prop units provides a user with a solution to the target analog.

15. A method for analogical reasoning as set forth in claim 14, wherein the act of activating the SP units in the source analog and propagating activity out to the Prop units and the semantic units, further comprises acts of:
initializing each SP unit with activation on a unique frequency, where activations are only passed to adjacent connected nodes, such that activations are passed in the source analog from SP units to Prop units, SP units to OP units, and OP units to semantic units, and where the activations are passed in the target analog from semantic units to OP units, OP units to SP units, and SP units to Prop units; and
propagating activation out from the SP units to the semantic units in the source analog, where each frequency is propagated independently such that semantic unit nodes receive activation on multiple frequencies.

16. A method for analogical reasoning as set forth in claim 15, wherein the acts of computing correlations for the OP units between the source analog and the target analog due to the semantic units, and combining the results of correlating due to the semantic units, further comprise acts of:
propagating activity received from SP units of the source analog from the predicate semantic nodes in the target analog;
computing correlations for the predicate nodes between the source analog and target analog due to the predicate semantic nodes alone;
computing correlations for the object nodes between the source analog and the target analog due to predicate semantic nodes alone;
clearing activity in the target analog;
propagating activity received from the SP units of the source analog from the object semantic nodes in the target analog;
computing correlations for the predicate nodes between the source analog and the target analog due to the object semantic nodes alone;
computing correlations for the object nodes between the source analog and the target analog due to the object semantic nodes alone; and
combining results from correlating due to object semantics and predicate semantics.

17. A method for analogical reasoning as set forth in claim 16, wherein the act of computing correlations further comprises an act of computing the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units that are being correlated, according to the following:

$$C_R(i,j) = \Sigma A_i(n) A_j(n),$$

where $A_i(n)$ and $A_j(n)$ are activation values of units i and j, respectively, on entry n;
and where matrix $C_N$ is calculated by dividing each entry in $C_R$ by the maximum entry in its row or column, according to the following:

$$C_N(i,j) = C_R(i,j) / [\max(C_R(\bullet,j), C_R(i,\bullet))],$$

wherein for at least one of the semantic units, SP units, Prop units, and OP units, a matrix $C_N$ is calculated for each of two passes through the neural network, wherein in one pass, activation flows from the source analog to the target analog through object semantic units, resulting in matrix $OC_N$, and wherein in another pass, activation flows through predicate semantic units, resulting in matrix $PC_N$.

18. A method of claim 17, wherein the act of combining the results from correlating due to object semantics and predicate semantics further comprises an act of determining which correspondences between the source analog and the target analog are the best by forming a composite matrix ($AllC_R$), the matrix $AllC_R$ being formed by calculating a weighted average of $OC_N$ and $PC_N$ according to the following:

$$AllC_R = \alpha OC_N + \beta PC_N,$$

where α and β are weight parameters between the range [0,1], and where once calculated, the composite matrix is normalized to create a resulting matrix (AllC$_N$) that determines the correspondences that are chosen, where the matrix AllC$_N$ is calculated according to the following:

$$AllC_N(i,j)=AllC_R(i,j)/[\max(AllC_R(\bullet,j),AllC_R(i,\bullet))].$$

19. A method for analogical reasoning as set forth in claim 15, wherein the acts of computing correlations for the OP units between the source analog and the target analog due to the semantic units and combining the results of correlating due to the semantic units, further comprises acts of:
propagating activity received from the SP units in the source analog from the predicate semantic nodes in the target analog;
computing correlations for the predicate nodes between the source analog and target analog due to the predicate semantic nodes alone;
computing correlations for the object nodes between the source analog and the target analog due to predicate semantic nodes alone;
combining results from the correlations.

20. A method for analogical reasoning as set forth in claim 19, wherein the act of computing correlations further comprises acts of:
computing the correlations by calculating a matrix of raw correspondences (C$_R$) and then competitively normalizing entries in the matrix C$_R$ to get a matrix of relative strengths (C$_N$), where matrix C$_R$ is calculated by multiplying activation vectors of every pair of units (i.e., nodes) that are being correlated, according to the following:

$$C_R(i,j)=\Sigma A_i(n)A_j(n),$$

where A$_i$(n) and A$_j$(n) are activation values of units i and j, respectively, on entry n;
and where matrix C$_N$ is calculated by dividing each entry in C$_R$ by the maximum entry in its row or column, according to the following:

$$C_N(i,j)=C_R(i,j)/[\max(C_R(\bullet,j),C_R(i,\bullet))],$$

wherein for at least one of the semantic units, SP units, Prop units, and OP units, a matrix C$_N$ is calculated where activation flows through predicate semantic nodes, resulting in matrix PC$_N$; and
when combining the results from correlating, performing an act of determining which correspondences between the source analog and the target analog are the best by creating a matrix (AllC$_N$) that determines the correspondences that are chosen, where the matrix AllC$_N$ is calculated according to the following:

$$AllC_N(i,j)=PC_N(i,j)/[\max(PC_N(\bullet,j),PC_N(i,\bullet))].$$

21. A method for analogical reasoning as set forth in claim 15, wherein the acts of computing correlations for the OP units between the source analog and the target analog due to the semantic units and combining the results of correlating due to the semantic units, further comprises acts of:
propagating activity received from the source analog out from the object semantic nodes in the target analog;
computing correlations for the predicate nodes between the source analog and the target analog due to the object semantic nodes alone;
computing correlations for the object nodes between the source analog and the target analog due to the object semantic nodes alone; and
combining results from the correlations.

22. A method for analogical reasoning as set forth in claim 21, wherein the act of computing correlations further comprises acts of:
computing the correlations by calculating a matrix of raw correspondences (C$_R$) and then competitively normalizing entries in the matrix C$_R$ to get a matrix of relative strengths (C$_N$), where matrix C$_R$ is calculated by multiplying activation vectors of every pair of units (nodes) that are being correlated, according to the following:

$$C_R(i,j)=\Sigma A_i(n)A_j(n),$$

where A$_i$(n) and A$_j$(n) are activation values of units i and j, respectively, on entry n;
and where matrix C$_N$ is calculated by dividing each entry in C$_R$ by the maximum entry in its row or column, according to the following:

$$C_N(i,j)=C_R(i,j)/[\max(C_R(\bullet,j),C_R(i,\bullet))],$$

wherein for at least one of the semantic units, SP units, Prop units, and OP units, a matrix C$_N$ is calculated where activation flows through object semantic nodes, resulting in matrix OC$_N$; and
when combining the results from correlating, performing an act of determining which correspondences between the source analog and the target analog are the best by creating a matrix (AllC$_N$) that determines the correspondences that are chosen, where the matrix AllC$_N$ is calculated according to the following:

$$AllC_N(i,j)=OC_N(i,j)/[\max(OC_N(\bullet,j),OC_N(i,\bullet))].$$

23. A computer program product for analogical reasoning, the computer program product comprising computer-readable instruction means stored on a computer readable medium for causing a computer to perform symbolic substitution by finding a correspondence between a target analog and a source analog to infer a solution to the target analog based on the source analog; and
further comprising instruction means for causing a computer to generate a source analog and a target analog, wherein each of the source analog and the target analog includes a plurality of nodes in the form of:
object/predicate units (OP units), where OP units are nodes that represent object nodes and predicate nodes independently of how they are bound together;
proposition units (Prop units), where Prop units are nodes that correspond to complete propositional statements to form a relational structure,
sub-proposition units (SP units), where SP units are nodes that represent sub-proposition units that are conjunctive representations of role-filler bindings, binding predicate nodes to object nodes; and
semantic units, where semantic units are nodes in a semantic domain that relate to a corresponding predicate node and object node, forming predicate semantic nodes and object semantic nodes respectively, where semantic units represent the meaningfulness of predicate and object nodes and the degree of similarity between multiple predicate nodes or multiple object nodes,
and where the source analog and the target analog share the same semantic domain with at least some shared semantic units.

24. A computer program product for analogical reasoning as set forth in claim 23, further comprising instruction means for causing a computer to perform the following operations:

activate the SP units in the source analog and propagate activity to the Prop units and the semantic units in the source analog;

propagate activity received from the SP units of the source analog from the semantic units in the target analog to at least one of the SP units, OP units, and Prop units in the target analog;

compute correlations for the OP units between the source analog and the target analog due to the semantic units;

combine correlations due to the semantic units;

competitively select single mappings between the source analog and the target analog of like kind OP unit nodes;

inferedly generate new inferred predicate nodes and inferred object nodes in the target analog for any that are unmapped in the source analog;

activate the target analog through the single mappings;

compute correlations for the SP units between the source analog and the target analog;

competitively select single mappings between the source analog and the target analog for the SP unit nodes;

inferedly generate new inferred SP unit nodes in the target analog for any that are unmapped in the source analog;

activate the target analog through all new single mappings;

compute correlations for the Prop units between the source analog and the target analog;

competitively select single mappings between the source analog and the target analog for the Prop units;

inferedly generate new inferred Prop unit nodes in the target analog for any that are unmapped in the source analog;

activate the target analog through all new single mappings;

compute correlations between inferred Prop units and inferred SP units in the target analog to find parents for the inferred SP units;

competitively connect the inferred Prop units to the inferred SP units when correlation strengths are greater than or equal to a predetermined threshold;

compute correlations between the inferred SP units and the inferred predicate nodes in the target analog to find children of the inferred SP units;

competitively connect the inferred SP units to predicate nodes when correlation strengths are greater than or equal to a predetermined threshold;

compute correlations between the inferred SP units and all the Prop units and object nodes in the target analog to find children of the SP units;

competitively connect the inferred SP units to Prop units or object nodes when correlation strengths are greater than or equal to a predetermined threshold;

compute correlations between inferred predicate nodes and all predicate semantic units in the target analog;

competitively connect inferred predicate nodes to predicate semantics when correlation strengths are greater than or equal to a predetermined threshold;

compute correlations between the inferred object nodes and all object semantic units in the target analog; and competitively connect inferred object nodes to object semantic units when correlation strengths are greater than or equal to a predetermined threshold, whereby a collection of the inferred object nodes, inferred predicate nodes, inferred SP units and inferred Prop units provides a user with a solution to the target analog.

25. A computer program product for analogical reasoning as set forth in claim 24, wherein when activating the SP units in the source analog and propagating activity out to the Prop units and the semantic units, the instruction means are further configured to cause a computer to perform the following operations:

initialize each SP unit with activation on a unique frequency, where activations are only passed to adjacent connected nodes, such that activations are passed in the source analog from SP units to Prop units, SP units to OP units, and OP units to semantic units, and where the activations are passed in the target analog from semantic units to OP units, OP units to SP units, and SP units to Prop units; and propagate activation out from the SP units to the semantic units in the source analog, where each frequency is propagated independently such that semantic unit nodes receive activation on multiple frequencies.

26. A computer program product for analogical reasoning as set forth in claim 25, wherein when computing correlations for the OP units between the source analog and the target analog due to the semantic units, and when combining the results of correlating due to the semantic units, the instruction means are further configured to cause a computer to perform the following operations:

propagate activity received from SP units of the source analog from the predicate semantic nodes in the target analog;

compute correlations for the predicate nodes between the source analog and target analog due to the predicate semantic nodes alone;

compute correlations for the object nodes between the source analog and the target analog due to predicate semantic nodes alone;

clear activity in the target analog;

propagate activity received from the SP units of the source analog from the object semantic nodes in the target analog;

compute correlations for the predicate nodes between the source analog and the target analog due to the object semantic nodes alone;

compute correlations for the object nodes between the source analog and the target analog due to the object semantic nodes alone; and combine results from correlating due to object semantics and predicate semantics.

27. A computer program product for analogical reasoning as set forth in claim 26, wherein when computing correlations, the instruction means are further configured to cause a computer to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units that are being correlated, according to the following:

$$C_R(i,j) = \Sigma A_i(n) A_j(n),$$

where $A_i(n)$ and $A_j(n)$ are activation values of units i and j, respectively, on entry n;

and where matrix $C_N$ is calculated by dividing each entry in $C_R$ by the maximum entry in its row or column, according to the following:

$$C_N(i,j) = C_R(i,j) / [\max(C_R(\bullet, j), C_R(i, \bullet))],$$

wherein for at least one of the semantic units, SP units, Prop units, and OP units, a matrix $C_N$ is calculated for each of two passes through the neural network, wherein in one pass, activation flows from the source analog to the target analog through object semantic units, resulting in matrix $OC_N$, and wherein in another pass, activation flows through predicate semantic units, resulting in matrix $PC_N$.

28. A computer program product of claim 27, wherein when combining the results from correlating due to object semantics and predicate semantics, the instruction means are configured to cause a computer to determine which correspondences between the source analog and the target analog are the best by forming a composite matrix ($AllC_R$), the matrix $AllC_R$ being formed by calculating a weighted average of $OC_N$ and $PC_N$ according to the following:

$$AllC_R = \alpha OC_N + \beta PC_N,$$

where $\alpha$ and $\beta$ are weight parameters between the range [0,1], and where once calculated, the composite matrix is normalized to create a resulting matrix ($AllC_N$) that determines the correspondences that are chosen, where the matrix $AllC_N$ is calculated according to the following:

$$AllC_N(i,j) = AllC_R(i,j)/[\max(AllC_R(\bullet,j), AllC_R(i,\bullet))].$$

29. A computer program product for analogical reasoning as set forth in claim 25, wherein when computing correlations for the OP units between the source analog and the target analog due to the semantic units, and when combining the results of correlating due to the semantic units, the instruction means are further configured to cause a computer to perform the following operations:

propagate activity received from the SP units in the source analog from the predicate semantic nodes in the target analog;

compute correlations for the predicate nodes between the source analog and target analog due to the predicate semantic nodes alone;

compute correlations for the object nodes between the source analog and the target analog due to predicate semantic nodes alone;

combine results from the correlations.

30. A computer program product for analogical reasoning as set forth in claim 29, wherein when computing correlations, the instruction means are further configured to cause a computer to compute the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units (i.e., nodes) that are being correlated, according to the following:

$$C_R(i,j) = \Sigma A_i(n) A_j(n),$$

where $A_i(n)$ and $A_j(n)$ are activation values of units i and j, respectively, on entry n;

and where matrix $C_N$ is calculated by dividing each entry in $C_R$ by the maximum entry in its row or column, according to the following:

$$C_N(i,j) = C_R(i,j)/[\max(C_R(\bullet,j), C_R(i,\bullet))],$$

wherein for at least one of the semantic units, SP units, Prop units, and OP units, a matrix $C_N$ is calculated where activation flows through predicate semantic nodes, resulting in matrix $PC_N$.

31. A computer program product of claim 30, wherein when combining the results from correlating, the instruction means are further configured to cause a computer to determine which correspondences between the source analog and the target analog are the best by creating a matrix ($AllC_N$) that determines the correspondences that are chosen, where the matrix $AllC_N$ is calculated according to the following:

$$AllC_N(i,j) = PC_N(i,j)/[\max(PC_N(\bullet,j), PC_N(i,\bullet))].$$

32. A computer program product for analogical reasoning as set forth in claim 25, wherein when computing correlations for the OP units between the source analog and the target analog due to the semantic units, and when combining the results of correlating due to the semantic units, the instruction means are further configured to cause a computer to perform the following operations:

propagate activity received from the source analog out from the object semantic nodes in the target analog;

compute correlations for the predicate nodes between the source analog and the target analog due to the object semantic nodes alone;

compute correlations for the object nodes between the source analog and the target analog due to the object semantic nodes alone; and combine results from the correlations.

33. A computer program product for analogical reasoning as set forth in claim 32, wherein when computing correlations, the instruction means are further configured to cause a computer to perform operations of:

computing the correlations by calculating a matrix of raw correspondences ($C_R$) and then competitively normalizing entries in the matrix $C_R$ to get a matrix of relative strengths ($C_N$), where matrix $C_R$ is calculated by multiplying activation vectors of every pair of units (nodes) that are being correlated, according to the following:

$$C_R(i,j) = \Sigma A_i(n) A_j(n),$$

where $A_i(n)$ and $A_j(n)$ are activation values of units i and j, respectively, on entry n;

and where matrix $C_N$ is calculated by dividing each entry in $C_R$ by the maximum entry in its row or column, according to the following:

$$C_N(i,j) = C_R(i,j)/[\max(C_R(\bullet,j), C_R(i,\bullet))],$$

wherein for at least one of the semantic units, SP units, Prop units, and OP units, a matrix $C_N$ is calculated where activation flows through object semantic nodes, resulting in matrix $OC_N$; and when combining the results from correlating, performing an operation of determining which correspondences between the source analog and the target analog are the best by creating a matrix ($AllC_N$) that determines the correspondences that are chosen, where the matrix $AllC_N$ is calculated according to the following:

$$AllC_N(i,j) = OC_N(i,j)/[\max(OC_N(\bullet,j), OC_N(i,\bullet))].$$

* * * * *